US006736312B2

United States Patent
Komurasaki et al.

(10) Patent No.: US 6,736,312 B2
(45) Date of Patent: May 18, 2004

(54) ELECTRONIC APPARATUS, ELECTRONIC APPARATUS OPERATION SYSTEM, AUTHENTICATION SYSTEM, AUTHENTICATION METHOD, AND INFORMATION STORAGE MEDIUM

(75) Inventors: Tadahisa Komurasaki, Kanagawa (JP); Sei Onishi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/202,173

(22) Filed: Jul. 24, 2002

(65) Prior Publication Data

US 2003/0024976 A1 Feb. 6, 2003

(30) Foreign Application Priority Data

Jul. 26, 2001 (JP) .................................... P2001-225998

(51) Int. Cl.[7] .............................................. G06F 17/00
(52) U.S. Cl. ...................... 235/375; 340/568.1; 340/5.6; 340/684
(58) Field of Search ..................... 235/375; 340/568.1, 340/5.6, 684

(56) References Cited

U.S. PATENT DOCUMENTS

| 4,734,896 A | * | 3/1988 | Soma et al. ............. 340/568.1 |
| 5,926,365 A | * | 7/1999 | Roelofs et al. ............. 361/684 |
| 6,377,160 B1 | * | 4/2002 | Groeger ....................... 340/5.6 |
| 6,618,807 B1 | * | 9/2003 | Wang et al. ................ 713/189 |

* cited by examiner

Primary Examiner—Karl D. Frech
Assistant Examiner—Daniel A. Hess
(74) Attorney, Agent, or Firm—Jay H. Maioli

(57) ABSTRACT

A system controller reads first identification information from a semiconductor storage medium. The system controller causes an audio block to operate when a portion of the first identification information coincides with one of a whole and a portion of the second identification information stored in a non-volatile memory. The system controller stores another portion of the first identification information as a portion of the second identification information in the non-volatile memory. Even if a user adds the first identification information to the semiconductor storage medium, an onboard audio apparatus reads and stores an additional portion of the first identification information in the non-volatile memory. The first identification information added by the user is used for a next operation enable/disable determination for the audio block.

18 Claims, 19 Drawing Sheets

FIG. 9
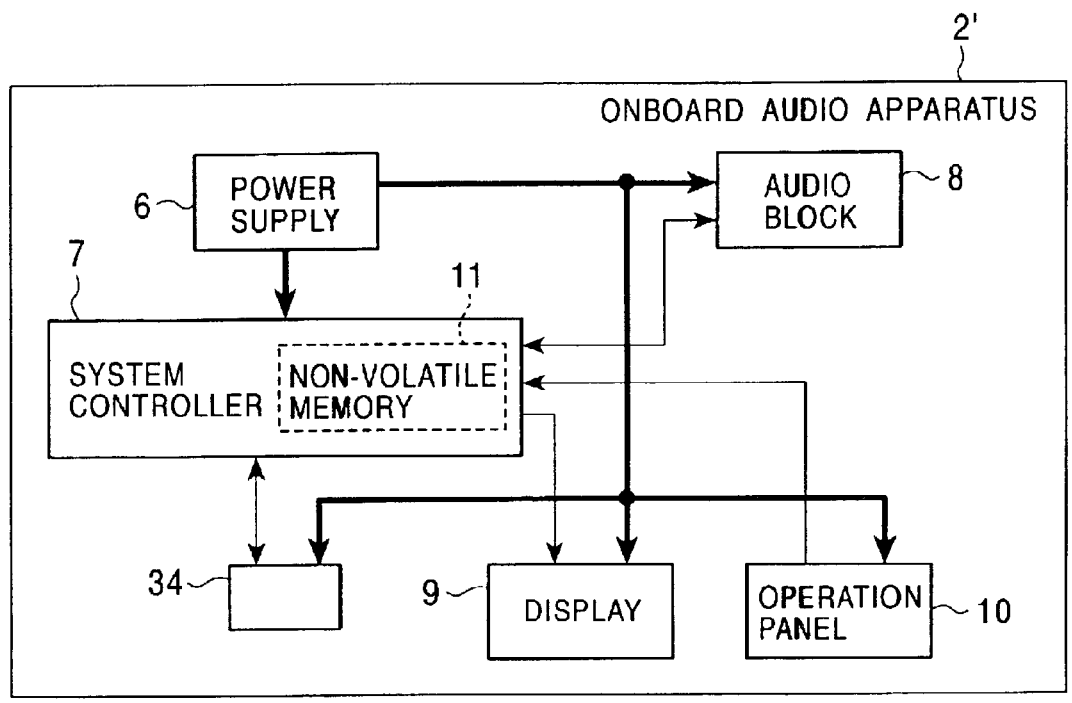
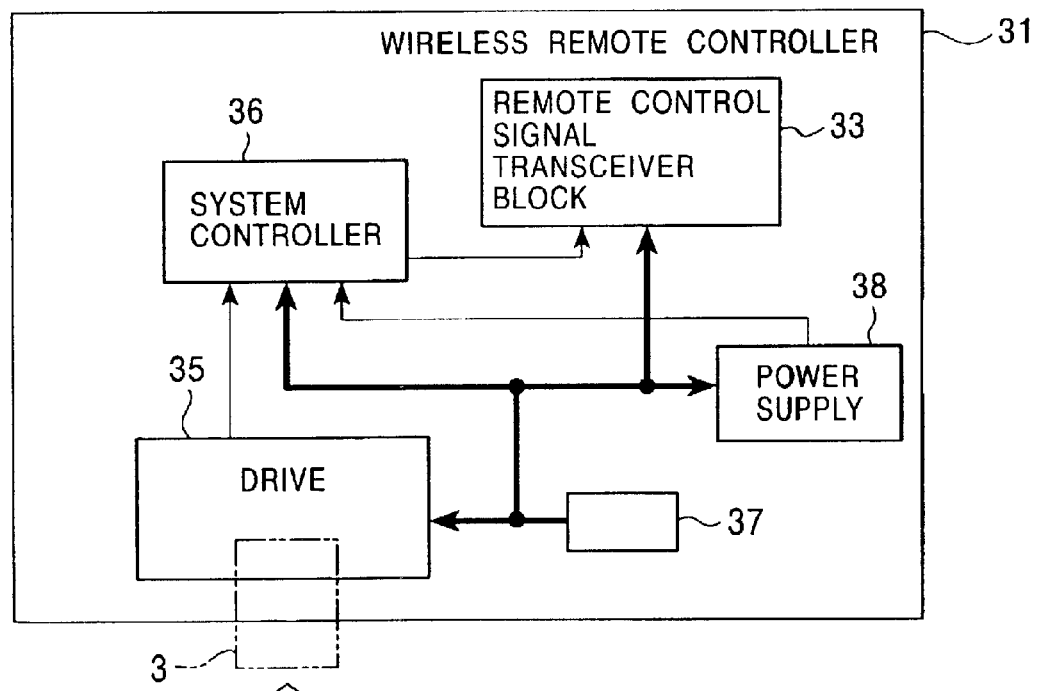
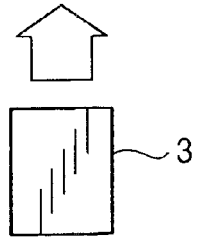

FIG. 18
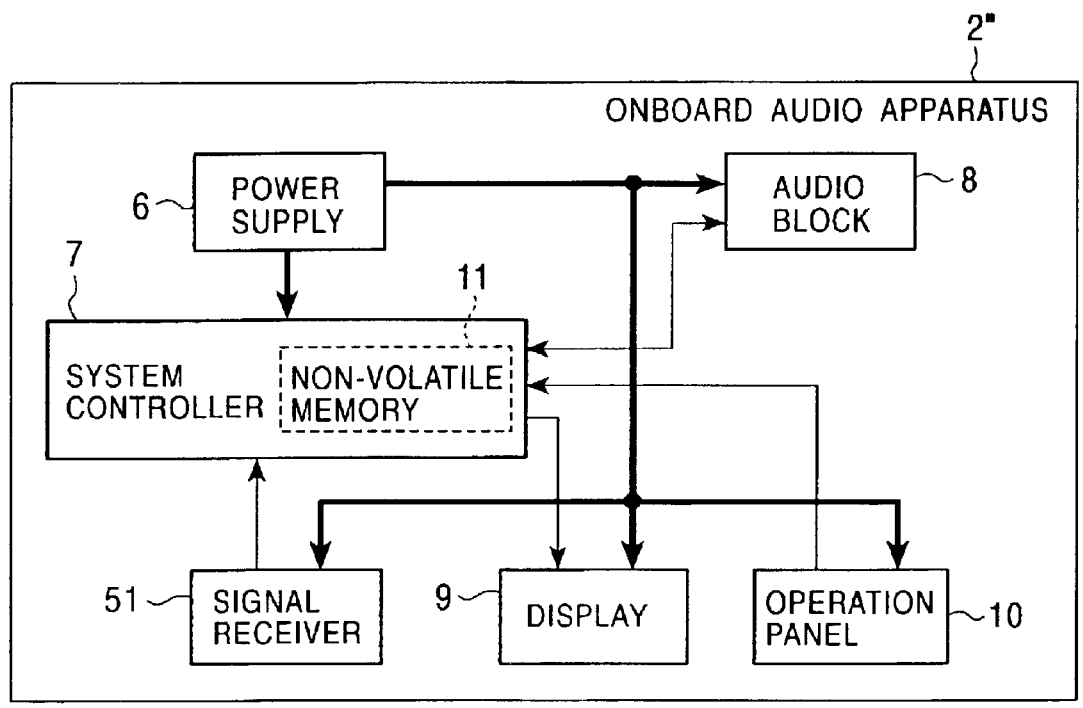
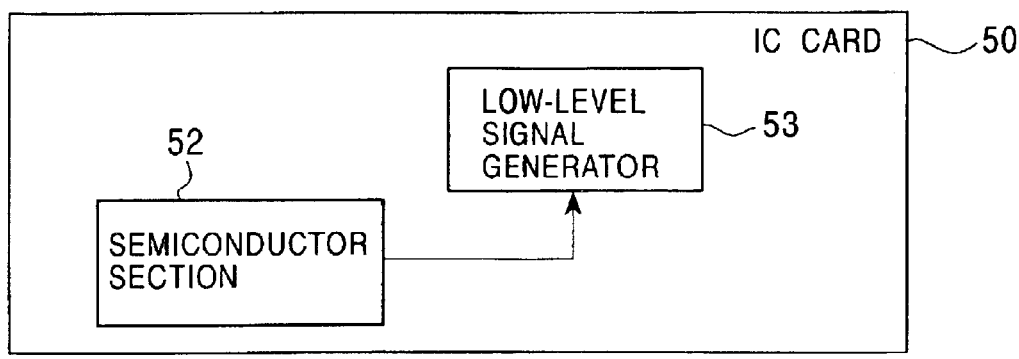

ELECTRONIC APPARATUS, ELECTRONIC APPARATUS OPERATION SYSTEM, AUTHENTICATION SYSTEM, AUTHENTICATION METHOD, AND INFORMATION STORAGE MEDIUM

BACKGROUND OF THE INVENTION

1. Field of the Invention

The present invention relates to an electronic apparatus and an electronic apparatus operation system operating subsequent to the authentication of a user, a system and method for authenticating the user, and an information storage medium for storing authentication information.

2. Description of the Related Art

Since the risk of theft of onboard apparatuses such as a car audio set is high today, various anti-theft means are devised and implemented in the attachment system of an apparatus and the front panel thereof.

When such a set is demounted for transportation, the set may be subject to various problems including scratches, damage, or even missing in the course of transportation. To prevent the set from missing, a security function using a code input to the set is contemplated. But such a security is troublesome. If the input code is simplified for easy operation, the level of security is lowered.

Another type of code input method has been proposed in which an input code may be stored in a card or a semiconductor storage medium, and the set is started by inserting the card into the set. This method presents another security problem that data to be input can be copied.

SUMMARY OF THE INVENTION

Accordingly, it is an object of the present invention to provide a technique that allows security lock to be disengaged in response to an easy operation while assuring the safety of input data.

An electronic apparatus of the present invention in a first aspect includes a control unit for reading information from an information storage medium which stores first identification information, an operation unit which operates under the control of the control unit, and a memory which stores second identification, and which the control unit reads information from and writes information to, wherein when a portion of the first identification information read from the information storage medium coincides with the whole or portion of the second identification information stored in the storage unit, the control unit causes the operation unit to operate, and causes the memory to store another portion of the first identification information as a portion of the second identification information.

In this arrangement, a user adds information set by the user himself to the first identification information or overwrites a portion of the first identification information with the user set information in the information storage medium. The control unit determines whether a portion of the first identification information coincides with the second identification information. If the first identification information prior to the addition or overwriting by the user coincides with the second identification information, the control unit causes the operation unit to operate. The other portion of the first identification information, namely, the information added or written by the user is stored as the portion of the second identification information. The second identification information thus contains the added (overwriting) information in the information storage medium.

Even if the user further adds information to the first identification information or further overwrites the first identification, a portion of the first identification information (the portion other than the added portion or the overwriting portion), which is subjected to comparison by the control unit, coincides with the whole or portion of the second identification information including information previously added or written by the user. The control unit causes the operation unit to operate, based on the determination that the portion of the first identification information coincides with the second identification information, and furthermore, the control unit stores newly added or overwriting information of the first identification information as a portion of the second identification information. Specifically, even if the user adds information to the first identification information or overwrites the first identification information, the control unit determines whether the two pieces of identification information, taking into consideration the added information or overwriting information coincide with each other next time. The control unit thus disengages security lock even if the user adds information to the identification information or overwrites the identification information.

Specifically, when information to be read, out of the first identification information, includes an additional portion, and when the remaining portion other than the additional portion coincides with the second identification information, the control unit may cause the memory to additionally store the additional portion as a portion of the second identification information. In this arrangement, the user successively adds first identification information.

Preferably, the control unit causes the information storage medium to store overwrite inhibition information with the additional portion associated therewith when the control unit reads the additional portion. In this arrangement, the read portion of the first identification information is free from overwriting, and there is no possibility that overwriting causes the second identification information on the electronic apparatus to be noncoincident with the first identification information.

Preferably, when information to be read, out of the first identification information, includes a newly overwriting portion, and when the remaining portion other than the newly written portion coincides with a portion of the second identification information, the control unit causes the memory to store the newly writing portion as another portion of the second identification information. In this arrangement, the user can successively overwrite the first identification information.

Preferably, the control unit causes the information storage medium to store read end information with the newly overwriting portion associated therewith when the control unit reads the newly overwriting portion. In this arrangement, the control unit determines which portion to overwrite when overwriting the first identification information.

An electronic apparatus operation system of the present invention in a second aspect includes a portable information storage medium having a read and write record area with identification information written on the record area, and an electronic apparatus which reads the identification information from the information storage medium. The electronic apparatus includes a drive into which the information storage medium is loaded, a memory for storing correspondence identification information corresponding to the identification information, a comparator which reads the identification information from the information storage medium loaded into the drive and compares the read identification information with the correspondence identification information, a starter which operates in response to the output from the comparator, and an additional storage device for storing, in the memory, at least a portion of additional information about the identification information stored in the record area, as a portion of the correspondence identification information.

In this arrangement, the electronic apparatus or at least one function of the electronic apparatus is started using the portable information storage medium. In this case, identification information stored in the information storage medium can be added. The addition of the identification information includes overwriting of information, namely, deleting information and then writing new information on space left after the deleted information. Preferably, the drive and the comparator exchange information with each other through radio link. In this case, the information storage medium is mounted on a wireless commander, and the identification information is transmitted to the electronic apparatus through the wireless commander.

Preferably, the electronic apparatus is an onboard apparatus.

The present invention in a third aspect is embodied in an authentication system that determines whether to enable or disable at least one function of the electronic apparatus, based on user authentication. The authentication system includes an information storage medium for storing identification information of the user, a control unit which reads the identification information from the information storage medium and determines whether to enable or disable at least one function of the electronic apparatus, and a memory which is controlled by the control unit and stores authentication information for authenticating the user, wherein the information storage medium includes a record area for storing additional identification information set by the user, and wherein when the authentication information includes additional authentication information and when the additional authentication information coincides with the whole or portion of the additional identification information, the control unit enables at least one of the functions of the electronic apparatus to operate.

The added identification information is compared with the additional authentication information in the electronic apparatus to perform authentication. The identification information is added to the information storage medium by storing the additional authentication information in the electronic apparatus by any means. In this case, as well, the addition of the identification information includes overwriting of a portion of the identification information (partly deleting information and then writing new information on space left after the deleted information).

Preferably, the additional identification information includes user information set by the user, and a flag associated with the user set information, wherein the control unit determines whether the user set information associated with the flag having a first predetermined value, out of the additional identification information, coincides with the additional authentication information. In this arrangement, the additional authentication information of the electronic apparatus and the user added identification information to be compared therewith may be differentiated by flag.

Preferably, the control unit causes the memory to store, as a portion of the additional authentication information, the user set information, out of the additional identification information, associated with a flag having a second predetermined value different from the first predetermined value. In this arrangement, a predetermined portion of the added identification information differentiated by flag may be stored in the electronic apparatus as the additional authentication information.

Preferably, the control unit overwrites, with the first predetermined value, a flag, in the information storage medium, associated with the user set information to be stored in the memory as the portion of the additional authentication information. In this arrangement, whether to compare the user set information read in the electronic apparatus with the read authentication information, namely, the additional authentication information is determined by referring to the flag.

The authentication system may include an identification information storage device for storing the additional identification information in the information storage medium. The control unit stores the second predetermined value to a flag in the information storage medium, other than the flag having the first predetermined value written thereon. The identification information storage device stores new user set information in a segment of the record area to which the user set information associated with the flag having the second predetermined value is to be stored. In this arrangement, the addition to or overwriting of the identification information is performed using a record area other than an area for the additional identification information (the user set information associated with the flag having the first predetermined value) to be compared with the additional authentication information. The overwriting of the identification information does not destroy data required for authentication.

Preferably, the authentication system further includes an identification information storage device for storing the additional identification information in the information storage medium, wherein the control unit stores a third predetermined value different from any of the first and second predetermined values, to a flag in the information storage medium other than the flag having the first predetermined value written thereon, and wherein the identification information storage device stores new user set information in a segment to which the user set information associated with the flag having the third predetermined value is stored, and the identification information storage device stores the second predetermined value onto the flag. When the overwriting of the identification information is performed, the control unit recognizes, out of the record area of the information storage medium, an area which stores information other than the additional identification information (the user set information associated with the flag having the first predetermined value) to be compared with the additional authentication information, by referring to the flag having the third predetermined value, and uses this area for overwriting.

The present invention in a fourth aspect relates to an information storage medium loaded at the startup of an electronic apparatus, and having portability for authenticating a user of the electronic apparatus. The information storage medium includes an initial identification information record area on which initial identification information corresponding to initial authentication information stored in the electronic apparatus is stored, and a user record area-on which user set information set by the user is stored.

In this arrangement, the user adds the user set authentication information set by the user himself by allowing the user set information to be recorded in the information storage medium.

Preferably, the user record area includes a user record section for storing the user set information, and a flag record section, associated with the user set information, for storing a flag representing the nature of the user set information. In this arrangement, whether to treat the identification information set by the user as information to be read or to overwrite information in the electronic apparatus is easily determined by flag.

Preferably, the information storage medium stores a startup software program for starting up an identification information storage device that stores the user set information in the user record area or for starting up a software program operating in the identification information storage device. In this arrangement, the addition or overwriting of the identification information is performed by simply loading the information storage medium to the identification information storage device.

Preferably, the startup software program has the function of authentication.

A method of the present invention in a fifth aspect for performing authentication determines whether first identification information stored in a first storage device coincides with second identification information stored in a second storage device. The authentication method includes a first step of storing additional information to the first identification information in the first storage device, a second step of storing additionally storing the additional information onto the second storage device as a portion of the second identification information when the first identification information other than the additional information coincides with the second identification information, and a third step of determining whether the first identification information containing the additional information added thereto coincides with the second identification information with the portion added thereto. The user thus modifies the identification information by himself by successively storing additional information added to the first identification information to the second storage device. The addition of the additional information includes overwriting of the identification information, namely, partly deleting information and then writing new information on space left after the deleted information.

BRIEF DESCRIPTION OF THE DRAWINGS

FIG. 9 is a block diagram of the electronic apparatus operation system;

FIG. 18 is a block diagram of the electronic apparatus operation system; and

DESCRIPTION OF THE PREFERRED EMBODIMENTS

The embodiments of the present invention are discussed below with reference to the accompanying drawings.

First Embodiment

A first embodiment of the present invention is now discussed.

Figure 2:
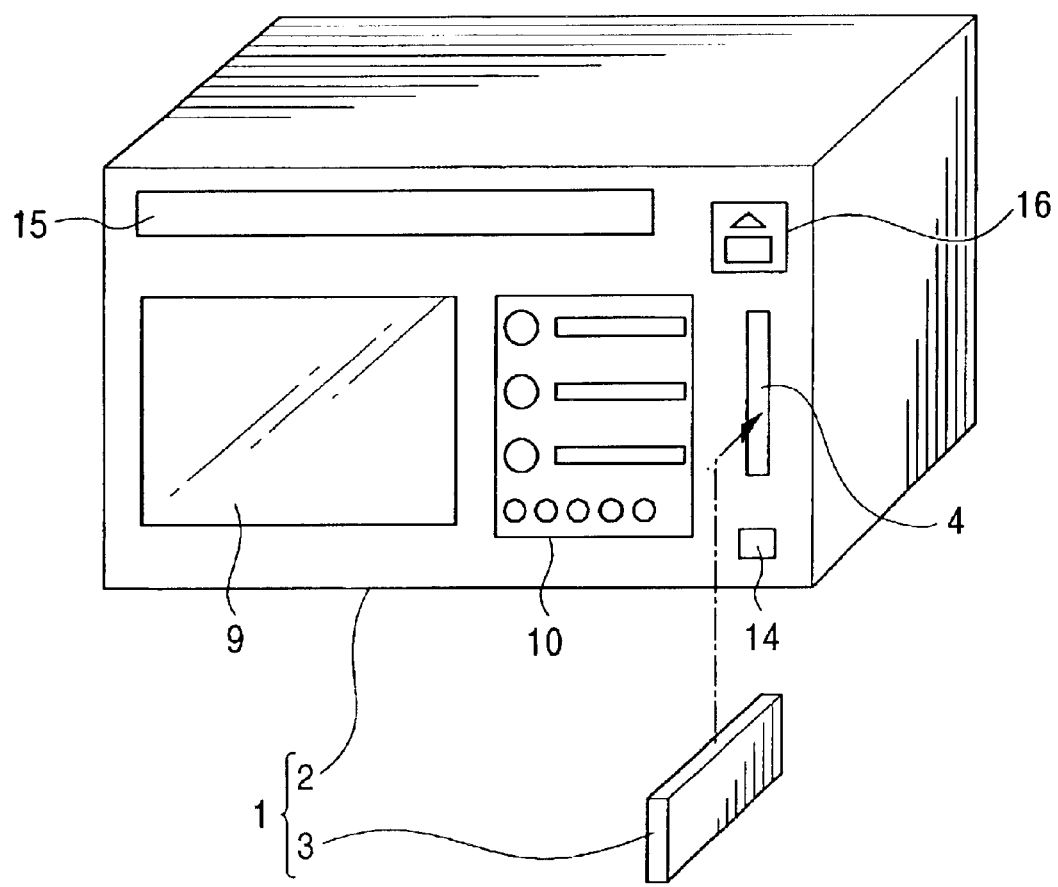
FIG. 2 is an external perspective view of the electronic apparatus operation system.

FIG. 2 is illustrates an electronic apparatus operation system 1 in accordance with the first embodiment of the present invention. As shown, the electronic apparatus operation system 1 includes an onboard audio apparatus (an electronic apparatus) 2, and a semiconductor storage medium (an information storage medium or a first storage device) 3 that can be loaded in the onboard audio apparatus 2.

The onboard audio apparatus 2 is now discussed.

Figure 1:
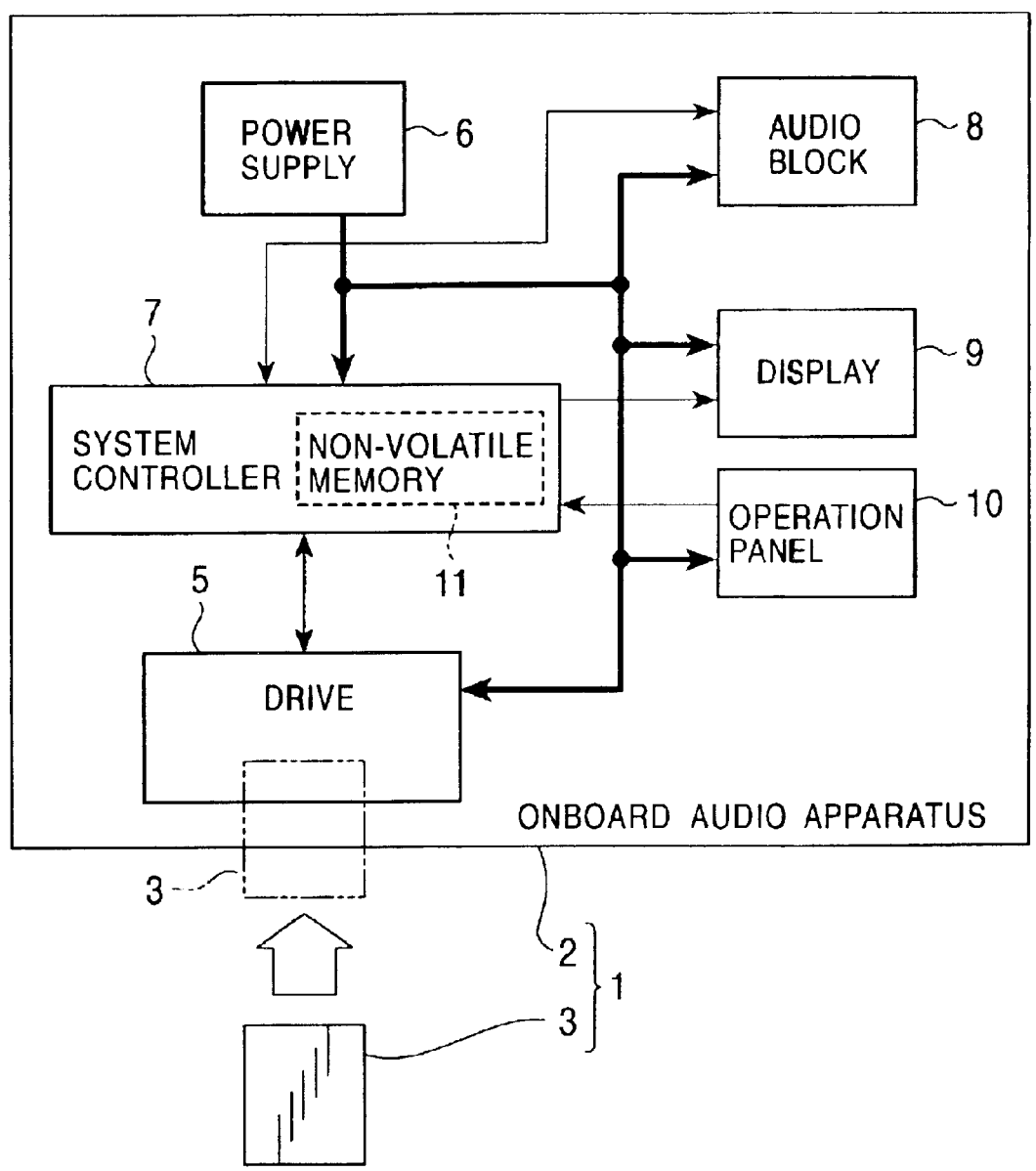
FIG. 1 is a block diagram of an electronic apparatus operation system in accordance with a first embodiment of the present invention.

The onboard audio apparatus 2 is installed on an automobile (not shown). Referring to FIG. 1, the onboard audio apparatus 2 includes a drive 5 to which the semiconductor storage medium 3 is loaded and unloaded through a semiconductor storage medium slot 4 (see FIG. 2), a power supply 6 for supplying power to each block in the onboard audio apparatus 2, a system controller (a control unit or a comparator) 7 connected to the drive 5, an audio block 8 (an operation unit) connected to the system controller 7, a display (the operation unit) 9, and an operation panel (the operation unit) 10.

The drive 5 directly reads information from the semiconductor storage medium 3 or writes information to the semiconductor storage medium 3. The drive 5 is controlled by the system controller 7. The drive 5 exchanges, with the system controller 7, information read from the semiconductor storage medium 3 or information to be written to the semiconductor storage medium 3.

The audio block 8 contains the functions of a tuner for reading a compact disk, an amplifier, or outputting signals. The audio block 8 is controlled by the system controller 7. The display 9 displays the operation status of the audio block 8 output from the audio block 8 through the system controller 7. The operation panel 10 is used to operate the audio block 8 through the system controller 7.

The system controller 7 contains a non-volatile memory (a memory or a second storage device) 11. As will be discussed later, the non-volatile memory 11 stores second identification information (authentication information, or correspondence identification information) corresponding to first identification information (identification information) stored in the semiconductor storage medium 3. In the first embodiment, a storage device external to the system controller 7 may be used instead of the non-volatile memory 11.

The onboard audio apparatus 2 further includes a semiconductor storage medium eject button 14 for ejecting the semiconductor storage medium 3 from the drive 5, a medium slot 15 through which a medium such as a compact disk may be inserted, and a medium eject button 16.

The semiconductor storage medium 3 will now be discussed.

Figure 3:
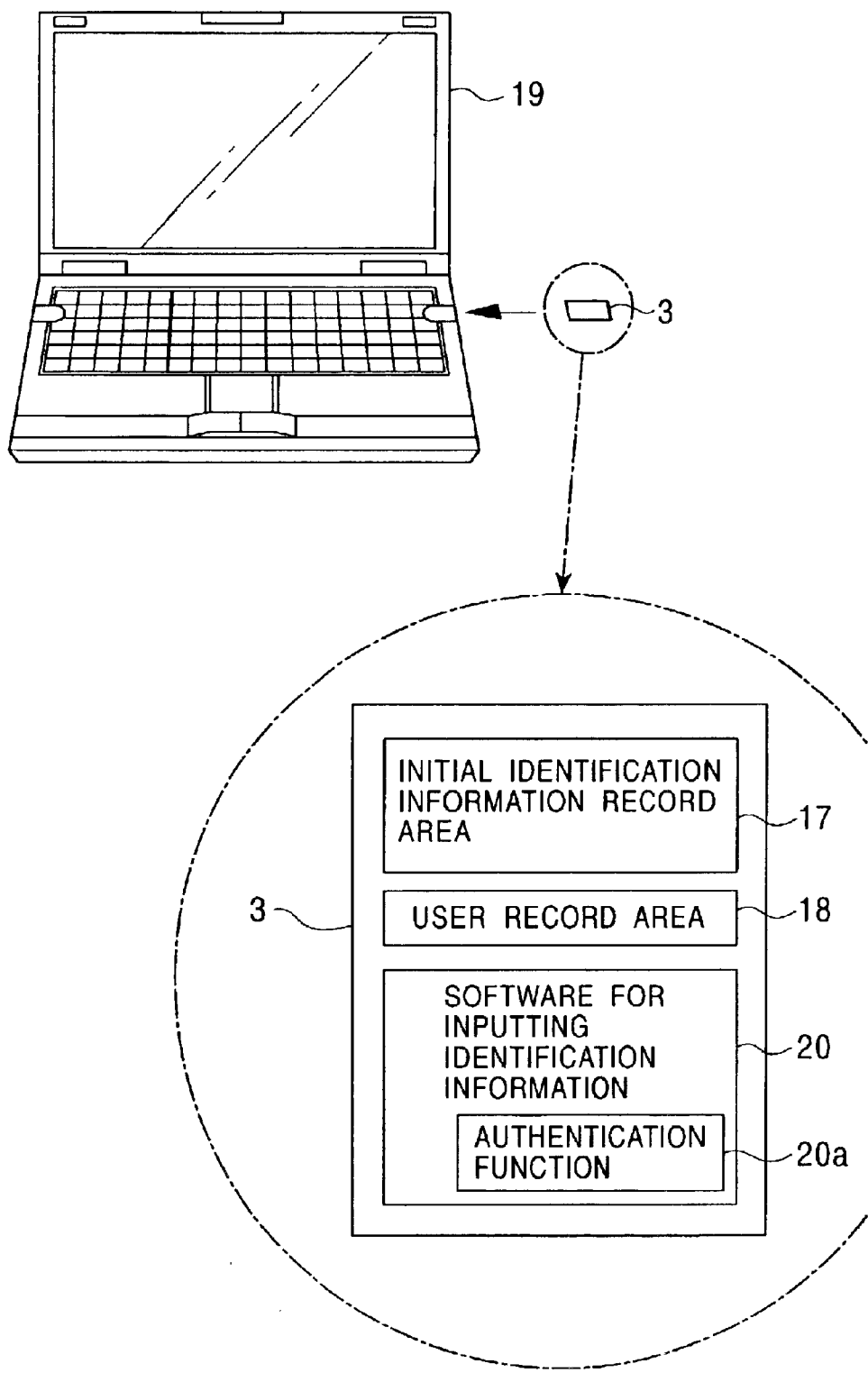
FIG. 3 illustrates a personal computer for adding information to identification information or overwriting the identification information in a record area, and the record area in a semiconductor storage medium for use in the electronic apparatus operation system illustrated in FIGS. 1 and 2.

The semiconductor storage medium 3 houses a semiconductor which information is read from or written to. Referring to FIG. 3, the semiconductor storage medium 3 includes, as record areas, an initial identification information record area 17, and a user record area 18. The semiconductor storage medium 3 stores a software program 20 for inputting identification information.

Initial identification information is stored in the initial identification information record area 17. The initial identification information is stored beforehand prior to the shipment of the electronic apparatus operation system 1. The initial identification information forms first identification information corresponding to second identification information stored in the non-volatile memory 11 in the onboard audio apparatus 2. User set information is stored in the user record area 18. The user can store the user set information in addition the initial identification information in the semiconductor storage medium 3, and the user set information forms a portion of the first identification information other than the initial identification information. The semiconductor storage medium 3 stores the user set information in addition to the initial identification information. The user set information is stored by the user himself when the semiconductor storage medium 3 is loaded into a personal computer (an identification information storage device) 19 as shown in FIG. 3.

The identification-information inputting software program 20 stored in the semiconductor storage medium 3 is automatically read by the personal computer 19 when the semiconductor storage medium 3 is loaded into the personal computer 19. The personal computer 19 then starts the identification-information inputting software program 20. The identification-information inputting software program 20 is used when the user writes information onto the user record area 18 using the personal computer 19. The identification-information inputting software program 20 has an authentication function 20*a* for requesting a password at the startup.

Figure 4:
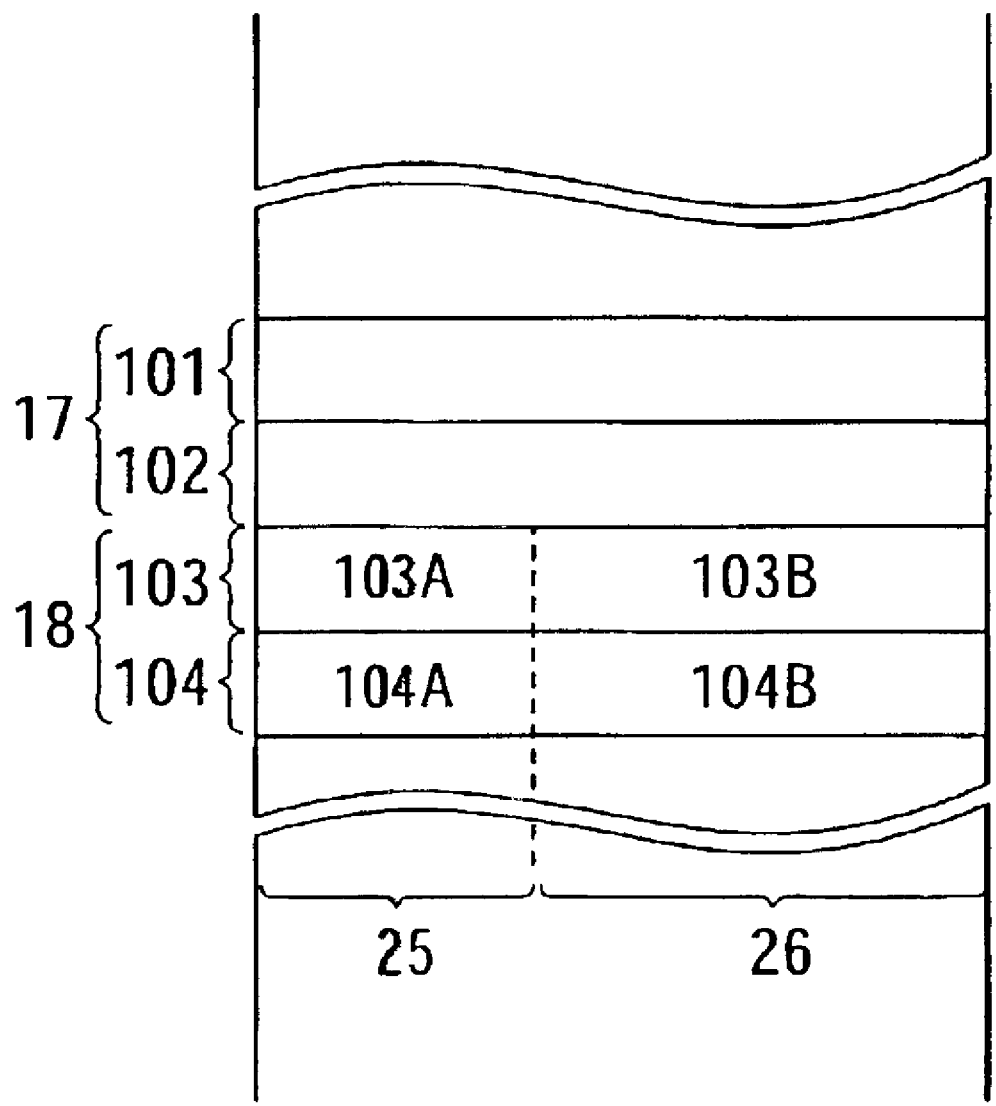
FIG. 4 illustrates an initial identification information record area and a user record area in the semiconductor storage medium illustrated in FIG. 3.

FIG. 4 diagrammatically illustrates the construction of the initial identification information record area 17 and the user record area 18, out of the record areas of the semiconductor storage medium 3. Referring to FIG. 4, the user record area 18 includes two record segments 103 and 104. Each of the record segments 103 and 104 is divided into a flag record section 25 and a user record section 26. The user record section 26 stores the user set information set by the user himself. The flag record section 25 stores a flag associated with the user set information stored in each of the record segments 103 and 104. The personal computer 19 or the onboard audio apparatus 2, on which the identification-information inputting software program 20 starts running, stores, in a flag, a predetermined value representing the nature of the user set information related to the flag.

The operation of an authentication system employing the above-referenced electronic apparatus operation system 1 is discussed below.

When the onboard audio apparatus 2 is operated, the authentication system embodied in the electronic apparatus operation system 1 determines whether the first identification information stored in the semiconductor storage medium 3 coincides with the second identification information stored in the non-volatile memory 11 in the onboard audio apparatus 2. The authentication system then determines whether to enable or disable the onboard audio apparatus 2.

The initial identification information is set at the shipment as the first identification information. In addition to the initial identification information, the user may add information set by the user himself to the first identification information using the personal computer 19. When the user set information is used in the authentication process in the determination of whether the onboard audio apparatus 2 is enabled or disabled, it becomes necessary to cause the onboard audio apparatus 2 to read the user set information and store the user set information as new second identification information. The reading of the user set information into the onboard audio apparatus 2 is automatically carried out when the authentication process is performed in the onboard audio apparatus 2.

The operation in which the user adds the user set information to the semiconductor storage medium 3 in addition to the initial identification information is discussed below.

When the user gets the electronic apparatus operation system 1, the user may input the user set information to the semiconductor storage medium 3 using the personal computer 19. Prior to the first input by the user, each of the segments 103B and 104B in the user record section 26 is blank with no information stored therewithin. In the segments 103A and 104A in the flag record section 25, "1" is stored in a flag of the segment 103A (a third predetermined value), and "0" is stored in a flag of the segment 104A.

The flag value "0" means that the portion 103B or 104B in the user record section 26, of the segment 103 or 104 to which the flag belongs to, has no data stored. The flag value "1" means that the portion 103B or 104B in the user record section 26, of the segment 103 or 104 to which the flag belongs to, is overwritable. As will be discussed later, a flag value "2" (a first predetermined value) from among the flag values means that the record area of a flag in the user record section 26 stores information which is already read into the onboard audio apparatus 2. A flag value "3" (a second predetermined value) means that the record area of a flag in the user record section 26 remains to be read into the onboard audio apparatus 2.

The flag value represents the presence or absence of information, or the nature of information in the user record area 18. As will be discussed later, the user set information stored in the user record area 18 will be used to determine operation enable/disable status of the onboard audio apparatus 2, and if this is overwritten by the personal computer 19, inconvenience takes place. Specifically, the value "1" is stored in the segment 103A or 104A, the segment 103B or 104B is overwritable. If the value "2" is stored in the segment 103A or 104A, overwriting of the segment 103B or 104B is inhibited. In this way, the user set information prior to the reading of information into the onboard audio apparatus 2 is prevented from being deleted as a result of overwriting.

The operation of the personal computer 19 when the user adds or overwrites the user set information in the semiconductor storage medium 3 will now be discussed with reference to FIG. 5.

Figure 5:
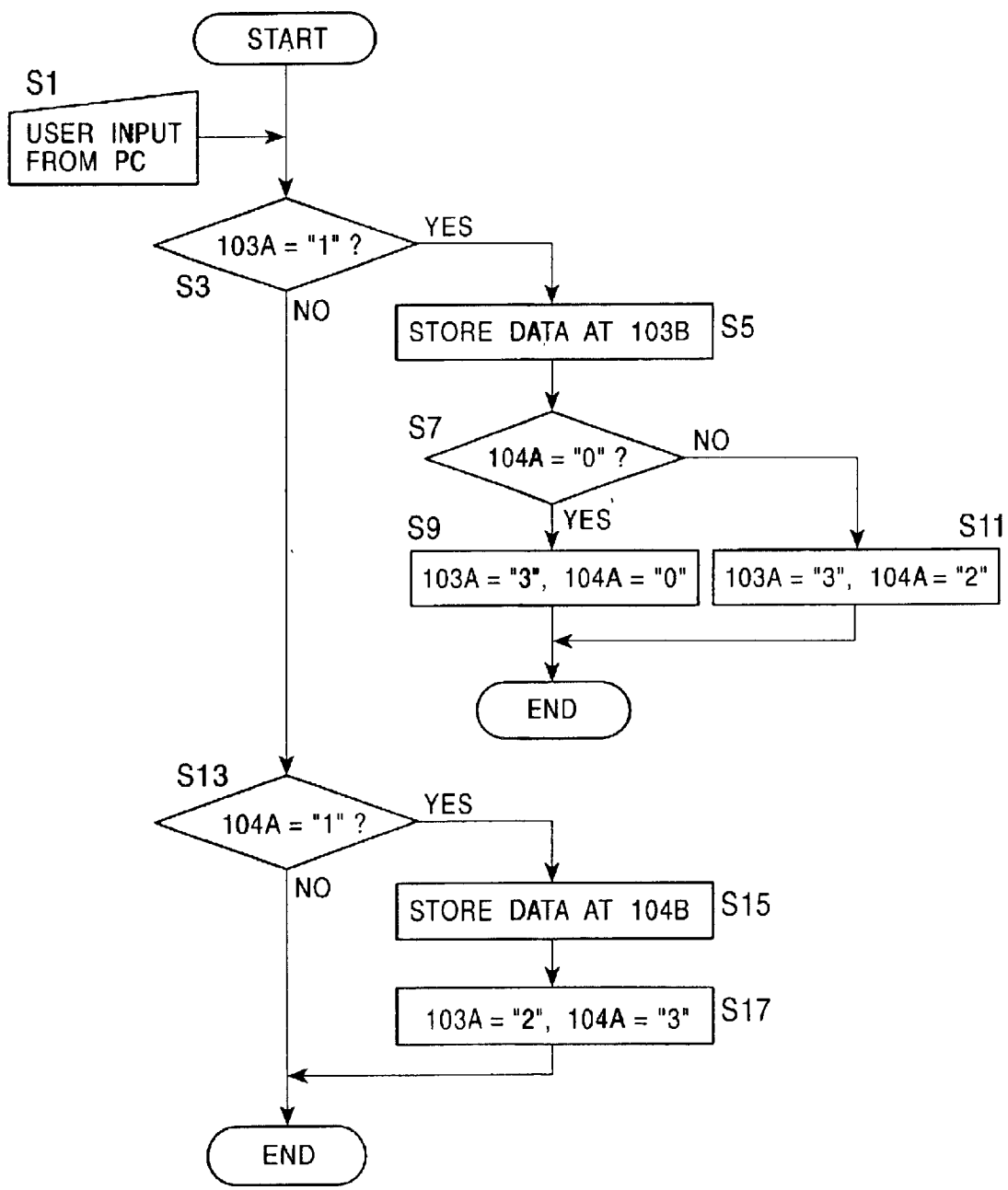
FIG. 5 is a flow diagram illustrating an operation procedure of the personal computer when the user performs addition or overwriting to the identification information in the semiconductor storage medium in the first embodiment of the present invention.

When the semiconductor storage medium 3 is loaded in the personal computer 19 as illustrated in FIG. 5, the identification-information inputting software program 20 stored in the semiconductor storage medium 3 is read into the personal computer 19. The identification-information inputting software program 20 starts running on the personal computer 19 (START in FIG. 5). The identification-information inputting software program 20 requests a password from the user, and starts the operation below when the password entered by the user coincides with a password recorded in the software program.

When the user adds or overwrites user set information, the user set information is input (step S1). The user may input the user set information in any method. For example, the identification-information inputting software program 20 may prompt the user to enter the user information such as the user's name, address, telephone number, or the user may enter the user set information in a free format.

The personal computer 19 determines whether the flag value in the segment 103A is "1" (step S3). When it is determined that the flag value in the segment 103A is "1", data input by the user is permitted to overwrite the segment 103B. The personal computer 19 then stores the user set information in the segment 103B (step S5). The personal computer 19 determines whether the segment 104A is "0" (step S7). If it is determined that the segment 104A is "0", the personal computer 19 stores "3" in the segment 103A (step S9). In this way, the data recorded in the segment 103B must be treated as data to be read into the onboard audio apparatus 2. If it is determined that the segment 104A is not "0", the personal computer 19 stores "3" to the segment 103A and "2" to the segment 103A (step S11). In other words, the data stored in the segment 103B is treated as information remaining to be read by the onboard audio apparatus 2, and the data stored in the segment 104B is treated as information that has already been read by the onboard audio apparatus 2.

If it is determined in step S3 that the flag value in the segment 103A is not "1", then it is determined whether the flag value in the segment 104A is "1" (step S13). If the flag value in the segment 104A is "1", the data input by the user can overwrite the segment 104B with the data input by the user, and the personal computer 19 stores the user set information in the segment 104B (step S15). Furthermore, the personal computer 19 stores "2" in the segment 103A, and "3" in the segment 104A (step S17). In other words, the data stored in the segment 103B is the data that has been already read by the onboard audio apparatus 2, and the data stored in the segment 104B is treated as information remaining to be read by the onboard audio apparatus 2.

When the user adds or overwrite the user set information in the semiconductor storage medium 3 in the above procedure, "2" is set to the flag associated with the user set information (with the flag thereof not "1") already stored in the semiconductor storage medium 3 and being not overwritable, "3" is set to the flag associated with newly input user set information, and "0" is set to the flag corresponding to the segment to which no user set information is input.

Figure 6:
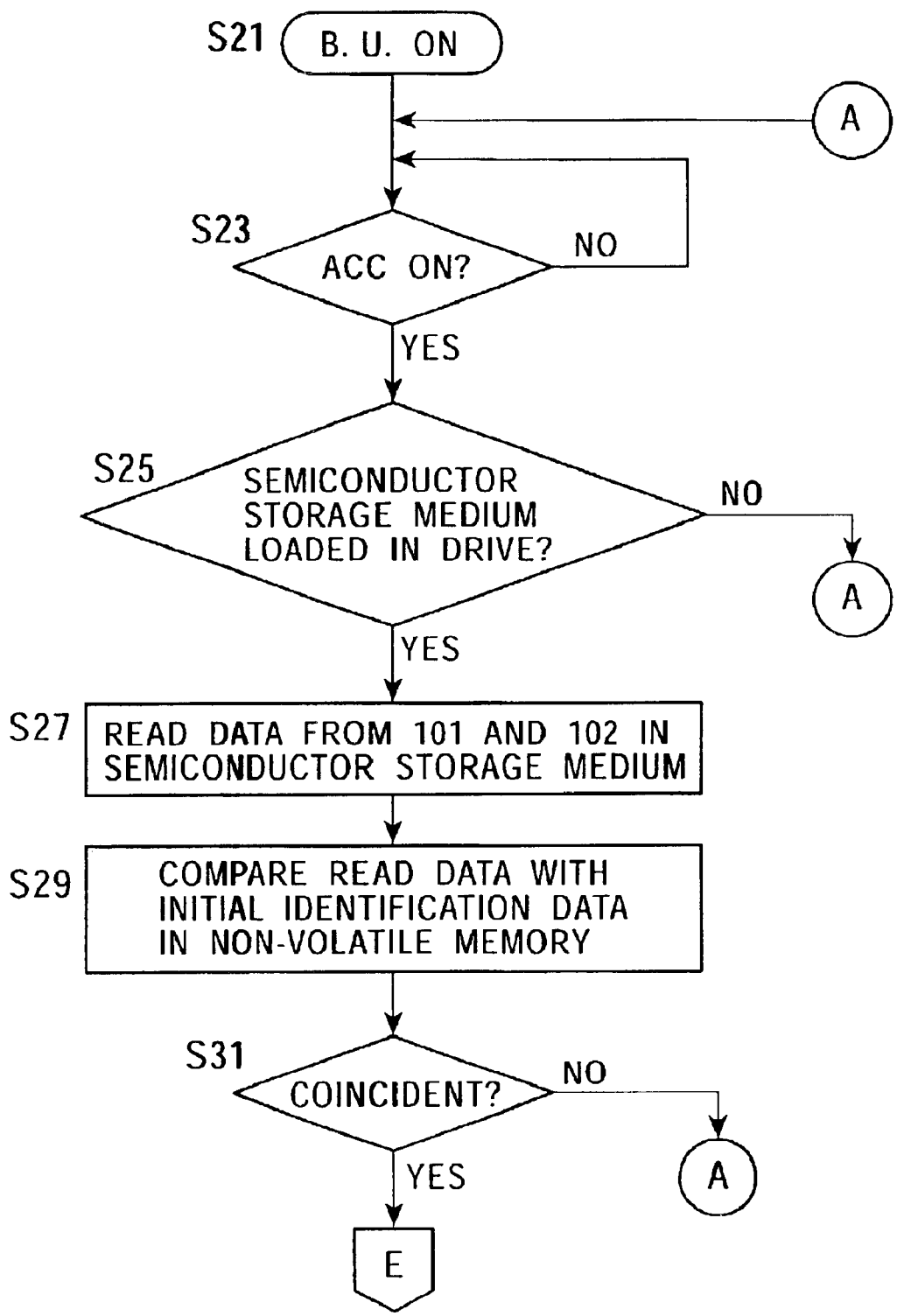
FIG. 6 is a flow diagram illustrating an authentication process that is performed in an onboard audio apparatus using the identification information stored in the semiconductor storage medium in accordance with the first embodiment of the present invention.
Figure 7:
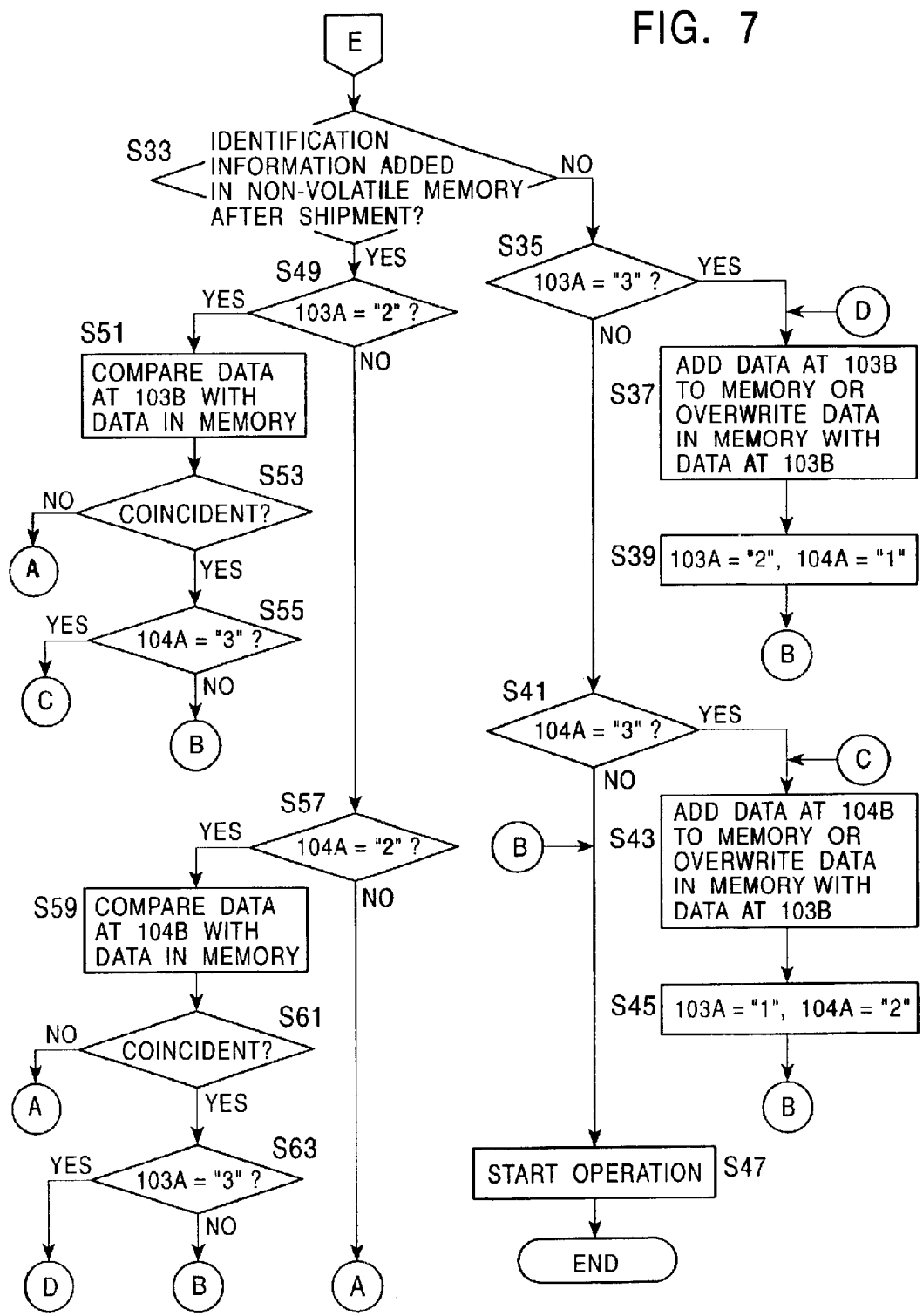
FIG. 7 is a continuation of the flow diagram of FIG. 6.

The operation enable/disable determination process of the onboard audio apparatus 2 making use of the first identification information stored in the semiconductor storage medium 3 is now discussed with reference to FIGS. 6 and 7.

When the onboard audio apparatus 2 is mounted on an automobile, the onboard audio apparatus 2 is continuously connected a power source (step S21). After detecting that the user starts the engine, the onboard audio apparatus 2 prepares for a startup (step S23).

The system controller 7 in the onboard audio apparatus 2 determines whether the semiconductor storage medium 3 is loaded in the drive 5 of the onboard audio apparatus 2 (step S25). When the semiconductor storage medium 3 is loaded in the drive 5 of the onboard audio apparatus 2, the drive 5 detects the semiconductor storage medium 3, and outputs a signal to the system controller 7. The system controller 7 performs step S27 and succeeding steps. If it is determined in step S25 that the semiconductor storage medium 3 is not loaded in the drive 5, the system controller 7 loops to the preparation state (A) prior to step S23. The algorithm starts again with step S23.

If it is determined in step S25 that the semiconductor storage medium 3 is loaded in the drive 5, the system controller 7 reads data about the initial identification information from record segments 101 and 102 in the initial identification information record area 17 in the semiconductor storage medium 3 (step S27). The system controller 7 then compares the read data with a portion of the second identification information, corresponding to the initial identification information, stored in the non-volatile memory 11 (step S29). When the two pieces of information coincide with each other, the algorithm proceeds to step S33 (E) in FIG. 7. If the two pieces of information do not coincide with each other, the algorithm loops to the startup preparation state (A) prior to S23. In other words, the system controller 7 denies the operation of the onboard audio apparatus 2.

It is then determined in step S33 whether information is added to the second identification information in the non-volatile memory 11 after the default setting, namely, after the shipment (step S33). If it is determined in step S33 that no additional information is present, no other data than the initial identification information is stored for authentication. In this case, the initial identification information which has been stored in the semiconductor storage medium 3 and the non-volatile memory 11 since shipment is already subjected to coincidence/non-coincidence determination in step S31. The authentication process is already finished prior to step S33. In the following steps, determination is made of whether data to be read into the onboard audio apparatus 2 is present in the semiconductor storage medium 3.

If it is determined in step S33 that no additional information is available, the system controller 7 determines whether the flag of the segment 103A in the semiconductor storage medium 3 is "3" (step S35). If the flag value of the segment 103A is "3", the system controller 7 adds the data in the segment 103B to the non-volatile memory 11 or overwrites the non-volatile memory 11 with the data in the segment 103B (step S37). In other words, the user set information associated with the flag having the value "3" is the data which is not yet read into the onboard audio apparatus 2 after the user writes it in the semiconductor storage medium 3. To use this data in the operation enable/disable determination of the onboard audio apparatus 2, this data must be read into the onboard audio apparatus 2.

Since the data in the segment 103B is read into the onboard audio apparatus 2 in step S37, the data in the segment 103B is now used in the authentication process, and the data in the segment 104B is thus permitted to be overwritten. Through the drive 5, the system controller 7 overwrites the flag of the segment 103A with "2" and the flag of the segment 104A with "1" (step S39). In this way, "2" is stored in the flag associated with the user set information read into the onboard audio apparatus 2, and "1" is stored in the flag of the segment 104A corresponding to the segment 104B in which no user set information is yet stored. When information is stored in the semiconductor storage medium 3 next time, the personal computer 19 is used to store new user set information in the segment 104B associated with the flag having the value "1".

Subsequent to step S39, the system controller 7 performs step S47 (B), thereby starting the operation of the onboard audio apparatus 2. Specifically, the onboard audio apparatus 2 causes the audio block 8 to operate, the operation panel 10 to be ready to receive inputs, and the display 9 to present a message indicating that the operation panel 10 is now ready.

If it is determined in step S35 that the flag value stored in the segment 103A is not "3", the algorithm proceeds to step S41. The system controller 7 determines whether the flag value stored in the segment 104A is "3". If the flag value stored in the segment 104A is "3", the data in the segment 104B corresponding to the segment 104A is the data which is not yet read into the onboard audio apparatus 2 after the user writes the data in the semiconductor storage medium 3. The system controller 7 thus adds the data in the segment 104B to the non-volatile memory 11 or overwrites the non-volatile memory 11 with the data in the segment 104B (step S43).

Since the data in the segment 104B is read into the onboard audio apparatus 2 in step S43, the data in the segment 104B is used in the authentication process for the next time, and the data in the segment 103B may be overwritten. Through the drive 5, the system controller 7 stores the value "1" in the segment 103A indicating that the segment 103B is overwritable, and furthermore, the system controller 7 stores the value "2" in the segment 104A indicating that the data in the segment 104B can be read into the onboard audio apparatus 2 (step S45). The system controller 7 proceeds to step S47 (B), thereby starting the operation of the onboard audio apparatus 2.

If it is determined in step S33 that there is additional information, the non-volatile memory 11 has data to be used in the authentication process in addition to the initial identification information. In the following steps, a coincidence/non-coincidence determination must be carried between the data and the data stored in the semiconductor storage medium 3 to perform user authentication.

If it is determined in step S33 that there is additional information, it is then determined whether the flag value of the segment 103A is "2" (step S49). If the flag value of the segment 103A is "2", the user set information stored in the segment 103B is already read into the onboard audio apparatus 2. The system controller 7 compares the data in the segment 103B with a portion of the data in the non-volatile memory 11 (step S51). A coincidence/non-coincidence determination is made of these pieces of data (step S53). If the two pieces of data fail to coincide with each other, the system controller 7 determines that the user is not authenticated, and loops to the startup preparation (A) prior to step 23, thereby denying the operation of the onboard audio apparatus 2.

If it is determined in step S53 that the data in the segment 103B coincides with the portion of the data in the non-volatile memory 11, the system controller 7 proceeds to step S55, and determines whether the flag value of the segment 104A is "3". If the flag value of the segment 104A is not "3", there is no data that remains to be read into the onboard audio apparatus 2 after the user writes the data into the semiconductor storage medium 3. The system controller 7 performs step S47 (B), thereby starting the operation of the onboard audio apparatus 2.

If it is determined in step S55 that the flag value of the segment 104A is "3", there is data in the segment 104B that remains to be read into the onboard audio apparatus 2 after being written into the semiconductor storage medium 3. The system controller 7 performs a read process to read the data in the segment 104B into the non-volatile memory 11. The algorithm then proceeds to step S43 (C). The system controller 7 adds the data in the segment 104B to the non-volatile memory 11 or overwrites the non-volatile memory 11 with the data in the segment 104B. In step S45, the system controller 7 overwrites the flag of the segment 103A with "1" and the flag of the segment 104A with "2", and then proceeds to step S47 (B), thereby starting the operation of the onboard audio apparatus 2.

If it is determined in step S49 that the flag value of the segment 103A is not "2", the system controller 7 determines in step S57 whether the flag value of the segment 104A is "2". In this way, the system controller 7 determines whether there is in the segment 104B the data which is already read into the onboard audio apparatus 2. If it is determined in step S57 that the flag value of the segment 104A is not "2", the data in the segments 103B and 104B is not read into the onboard audio apparatus 2 and these pieces of data do not coincide with the data in the non-volatile memory 11. The system controller 7 determines that authentication is unsuccessful, and loops to the startup preparation (A) prior to step S23. In other words, the system controller 7 denies the operation of the onboard audio apparatus 2.

If it is determined in step S57 that the flag value of the segment 104A is "2", the system controller 7 compares the data in the segment 104B with a portion of the data in the non-volatile memory 11 (step S59). A coincidence/non-coincidence determination is made (step S61). If the two pieces of data fail to coincide with each other, the system controller 7 determines that authentication is unsuccessful, loops to the startup preparation state (A) prior to S23, and denies the operation of the onboard audio apparatus 2. If it is determined in step S61 that the data in the segment 104B coincides with the portion of the data in the non-volatile memory 11, the system controller 7 determines in step S63 whether the flag value of the segment 103A is "3". If the flag value of the segment 103A is not "3" in step S63, there is no data that remains to be read into the onboard audio apparatus 2 after the user writes the data in the semiconductor storage medium 3. The system controller 7 performs step S47 (B), thereby starting the operation of the onboard audio apparatus 2. If it is determined in step S63 that the flag value of the segment 103A is "3", there is data that remains to be read into the onboard audio apparatus 2 after the user writes the data in the semiconductor storage medium 3. The system controller 7 reads the data in the segment 103B into the non-volatile memory 11. The algorithm proceeds to step S37 (D), and the system controller 7 adds the data in the segment 103B to the non-volatile memory 11 or overwrites the non-volatile memory 11 with the data in the segment 103B. In step S39, the system controller 7 overwrites the flag of the segment 103A with "2" and the flag of the segment 104A with "1". The system controller 7 performs step S47 (B), thereby starting the operation of the onboard audio apparatus 2.

After the above series of process steps, the onboard audio apparatus 2 may be demounted after being connected to the power source. When the onboard audio apparatus 2 is reconnected to the power source, the system controller 7 thereof requires information from the semiconductor storage medium 3 again. Specifically, the system controller 7 compares the initial identification information stored in the record segments 101 and 102 in the initial identification information record area 17, out of the first identification information stored in the semiconductor storage medium 3, with the portion of the second identification information stored in the non-volatile memory 11 in the onboard audio apparatus 2. If there is the user set information in the record segments 103 and 104 in the user record area 18 in the semiconductor storage medium 3, the data stored in the segment 103B or 104B is compared with the portion of the data in the non-volatile memory 11 in the onboard audio apparatus 2 for coincidence/non-coincidence determination. The authentication process is thus performed. If no user set information is read into the onboard audio apparatus 2, the system controller 7 determines whether the flag value of the segment 103A or 104A is "3". The data in the segment 103B or 104B associated with the flag having the value "3" is added or written in the non-volatile memory 11. When the authentication process is performed again, the added data or overwriting data is used. When the system controller 7 writes the value "1", indicating that the overwriting is possible, into the flag associated with the data other than read data, the user can write new user set data into the segment 103B or 104B in the semiconductor storage medium 3.

The authentication process is performed based on the identification information in addition to the initial identification information stored before shipment. In addition, when the user successively writes user set information in the semiconductor storage medium 3, the user set information is used in the authentication process. A high degree of security is thus assured.

As discussed above, the system controller 7 causes the audio block 8 to operate when the portion of the first identification information read from the semiconductor storage medium 3, namely, one of the data of the user set information stored in the segment 103B and 104B coincides with a portion of the second identification information stored in the non-volatile memory 11. The other data of the user set information stored in the segments 103B and 104B is additionally stored in the non-volatile memory 11 as a portion of the second identification information. The authentication process is thus performed using the user set information. Even if the user overwrites the first identification information in the semiconductor storage medium 3, the coincidence/non-coincidence determination of the identification information is carried out taking into consideration the overwriting information. Using the semiconductor storage medium 3, a simple authentication process is performed, and the security level is heightened. Since the user set information is added or overwrites, data updating is performed to assure security even if authentication data is known to someone else.

In the first embodiment, the user record area 18 in the semiconductor storage medium 3 includes the user record section 26 for storing the user set information and the flag record section 25 for storing the flag associated with the user set information. In accordance with the flag value in the flag record section 25, determination is made of whether to read into the onboard audio apparatus 2, to use in the authentication process, or to use in overwriting, the user set information in the user record section 26 corresponding to the flag record section 25. The user set information is easily managed. Since the determination of the overwriting of the user set information is performed based on the flag value, the user set information is updated by the overwriting. The user record section 26 is set up in a limited space.

Since a startup software program for starting a software program running on the personal computer 19 is stored in the semiconductor storage medium 3, the addition or the overwriting of the user set information is easily performed. The startup software program has also an authentication function, thereby assuring security of the onboard audio apparatus 2.

The first embodiment of the present invention has been discussed. The present invention is not limited to the first embodiment, and may use another construction without departing from the scope of the present invention.

For example, the first embodiment assures the security of the onboard audio apparatus 2. The present invention is not limited to this arrangement. Alternatively, the present invention may be applied to other electronic apparatuses such as a computer or an electronic lock.

In the first embodiment, the data for authenticating the user is stored in the semiconductor storage medium 3. Alternatively, the authenticating data may be stored in other storage media such as an IC card or a magnetic storage medium.

The elements of the first embodiment may be selectively used, or applied to another construction without departing from the scope of the present invention.

Second Embodiment

A second embodiment of the present invention will now be discussed.

Figure 8:
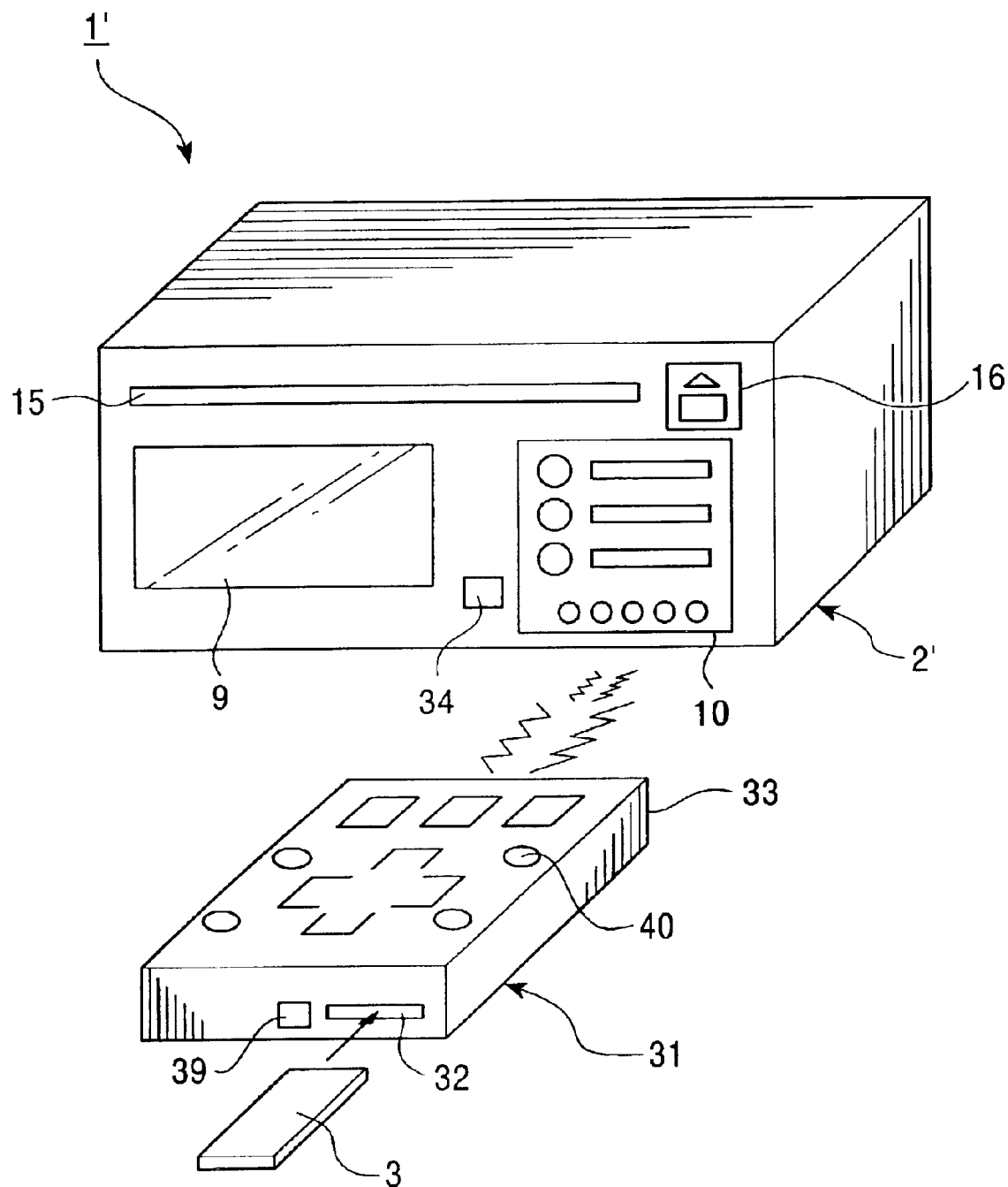
FIG. 8 is an external perspective view of an electronic apparatus operation system in accordance with second and third embodiments of the present invention.

FIG. 8 is illustrates an electronic apparatus operation system 1' in accordance with the second embodiment of the present invention. As shown, the electronic apparatus operation system 1' includes an onboard audio apparatus 2' (electronic apparatus), a wireless remote controller 31 for controlling the onboard audio apparatus 2', and a semiconductor storage medium (information storage medium) 3 to be loaded into a semiconductor storage medium slot 32 arranged in the wireless remote controller 31.

FIG. 9 is a block diagram illustrating the electronic apparatus operation system 1'. As shown, like the onboard audio apparatus 2, the onboard audio apparatus 2' in the second embodiment includes a power supply 6 for supplying power to each block in the onboard audio apparatus 2', a system controller 7 connected to a drive 35, an audio block 8 connected to the system controller 7, a display 9, and an operation panel 10. The system controller 7 contains a non-volatile memory 11, which stores second identification information (authentication information, or correspondence identification information) corresponding to first identification information (identification information) stored in the semiconductor storage medium 3.

The difference of the onboard audio apparatus 2' from the onboard audio apparatus 2 in the first embodiment is that the onboard audio apparatus 2' includes a remote control signal transceiver block 34 that exchanges information signals through radio link with a remote control signal transceiver block 33 in the wireless remote controller 31. The remote control signal transceiver block 34 is connected to the system controller 7 to exchange signals with the system controller 7.

The wireless remote controller 31 includes the remote control signal transceiver block 33, the drive 35 into which the semiconductor storage medium 3 is loaded, and a system controller 36 for controlling these units. The wireless remote controller 31 further includes a power supply 38 for feeding power to each block in the wireless remote controller 31, and an operation panel 10 for operating the onboard audio apparatus 2'. The drive 35 directly reads information from the semiconductor storage medium 3, and directly writes information to the semiconductor storage medium 3. The drive 35 is controlled by the system controller 36, and exchanges, with the system controller 36, information read from the semiconductor storage medium 3 or information to be written on the semiconductor storage medium 3.

The semiconductor storage medium 3 in the electronic apparatus operation system 1' remains unchanged from the semiconductor storage medium 3 in the first embodiment. Specifically, the semiconductor storage medium 3 contains the initial identification information record area 17 and the user record area 18, and stores the identification-information inputting software program 20. The construction of the initial identification information record area 17 and the user record area 18 is identical to that-illustrated in FIG. 4.

The authentication system of the electronic apparatus operation system 1' is discussed below.

Like the first embodiment, when the onboard audio apparatus 2' is operated, the authentication system using the electronic apparatus operation system 1' in the second embodiment determines whether the first identification information stored in the semiconductor storage medium 3 coincides with the second identification information stored in the non-volatile memory 11 in the onboard audio apparatus 2'. Based on this determination, the authentication system determines whether or not to operate the onboard audio apparatus 2'. The second embodiment is identical to the first embodiment in that the user adds the user set information to the semiconductor storage medium 3 in addition to the initial identification information, and in that the presence or absence of or the nature of the information in the user record area 18 is represented by the flag stored in the segments 103A and 104A.

The authentication process of the onboard audio apparatus 2' is discussed below with reference to FIGS. 10 through 13. The onboard audio apparatus 2' is operated after the authentication process of the onboard audio apparatus 2' is performed using the first identification information stored in the semiconductor storage medium 3.

Figure 10:
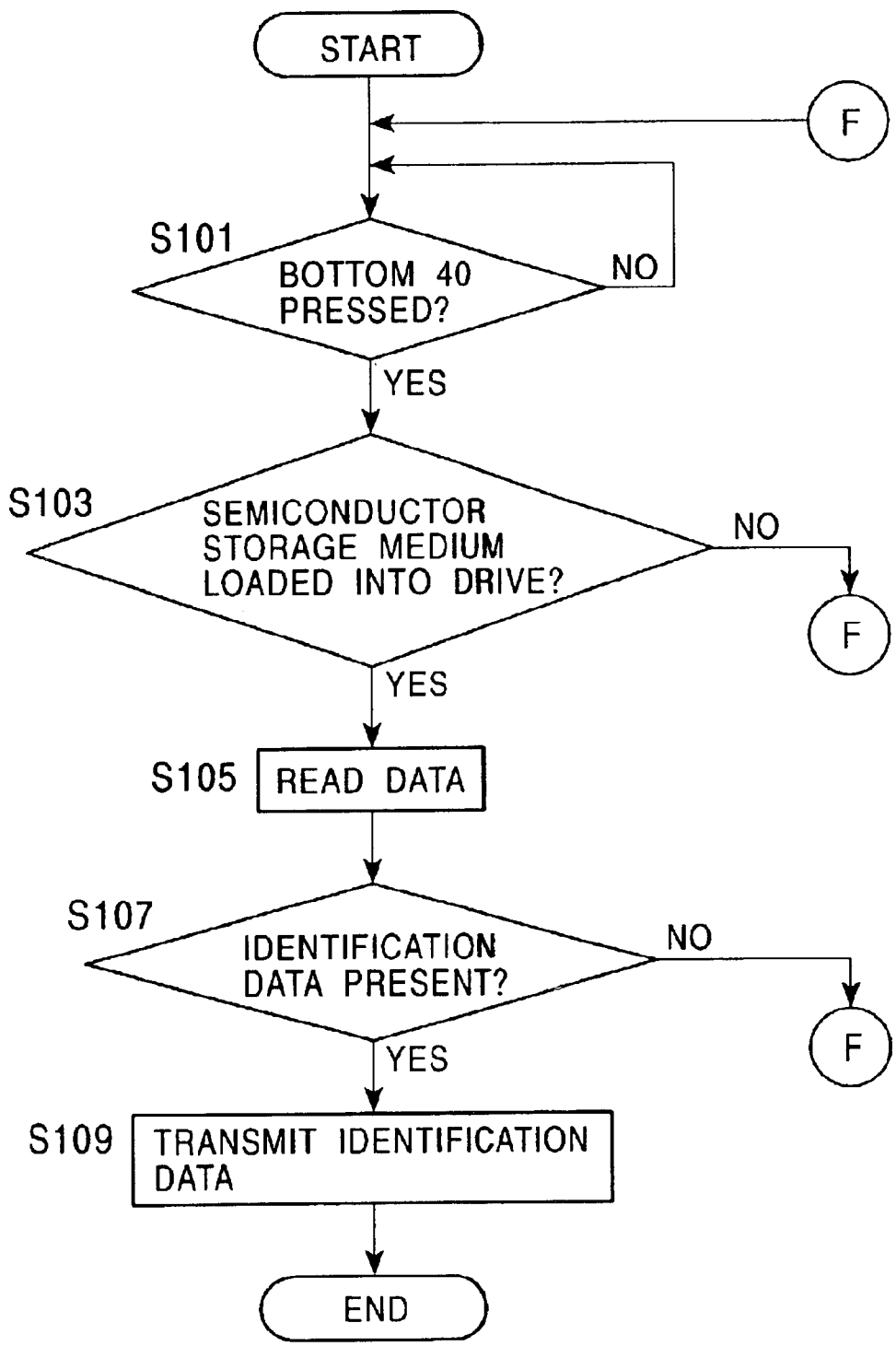
FIG. 10 is a flow diagram illustrating the operation procedure of a wireless remote control when an authentication process starts in accordance with the second embodiment of the present invention.

FIG. 10 illustrates the operation procedure of the wireless remote controller 31 when the onboard audio apparatus 2' is operated.

When the onboard audio apparatus 2' is operated, the user inserts the semiconductor storage medium 3 into the semiconductor storage medium slot 32 in the wireless remote controller 31, and presses button 40 (see FIG. 8) arranged on the wireless remote controller 31.

In response, the system controller 36 in the wireless remote controller 31 determines that the button 40 is pressed (step S101). The algorithm proceeds to step S103. The system controller 36 determines in step S103 whether the semiconductor storage medium 3 is inserted into the drive 35. If the drive 35 is appropriately inserted into the drive 35, the algorithm proceeds to step S105, and the system controller 36 reads data from the semiconductor storage medium 3. If the drive 35 is not appropriately inserted into the drive 35, the algorithm loops to the state prior to step S101 (F).

The system controller 36 determines whether the data read in step S105 contains the identification data, namely, the first identification information (step S107). If the data contains the identification data, the system controller 36 sends the identification data to the onboard audio apparatus 2' through the remote control signal transceiver block 33 (step S109). If it is determined in step S107 that no identification data is contained, the algorithm loops to state prior to step S101.

The operation of the onboard audio apparatus 2' is discussed below.

Figure 11:
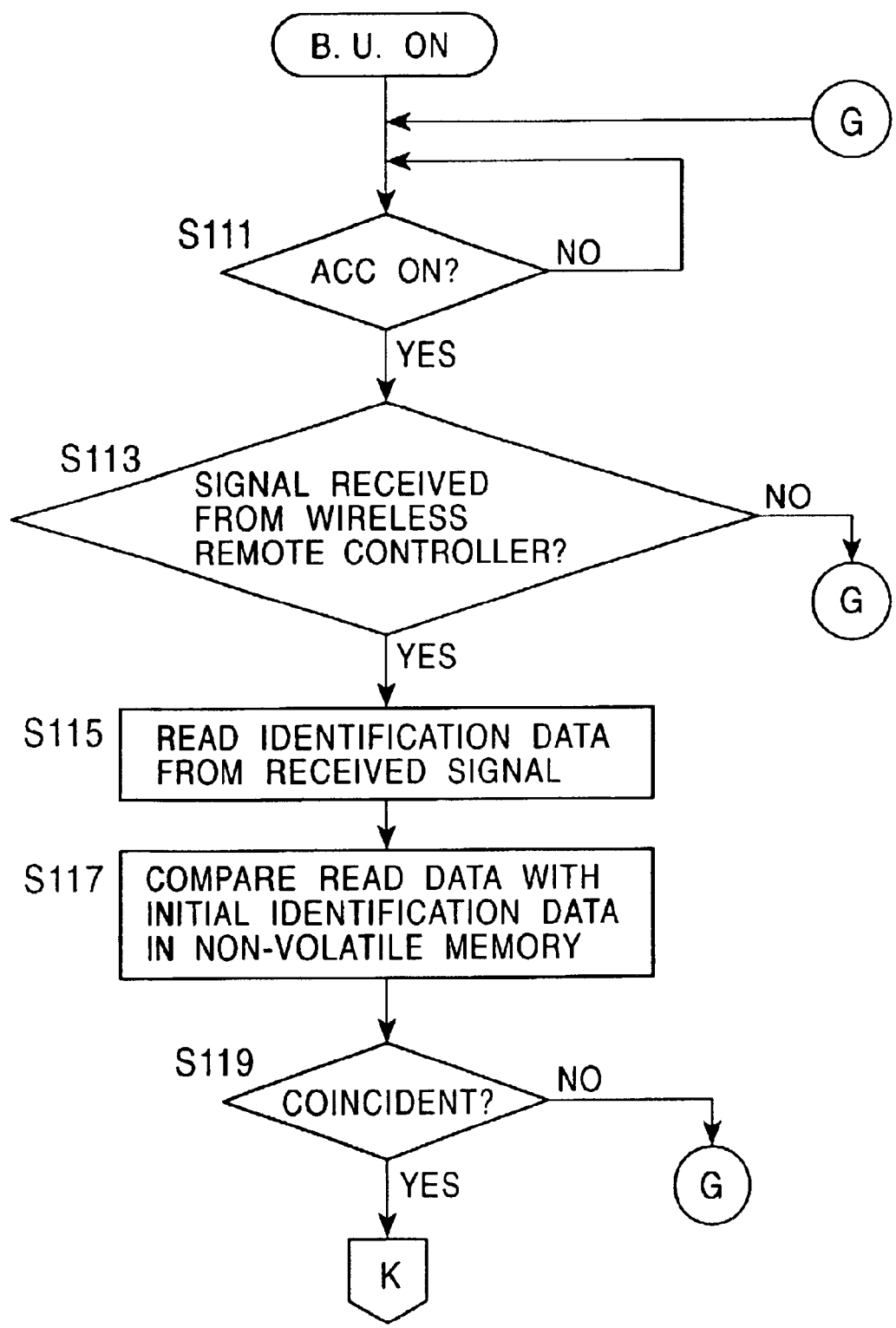
FIG. 11 is a flow diagram illustrating the authentication process of the onboard audio apparatus which uses the identification information stored in the semiconductor storage medium in accordance with the second embodiment of the present invention.
Figure 12:
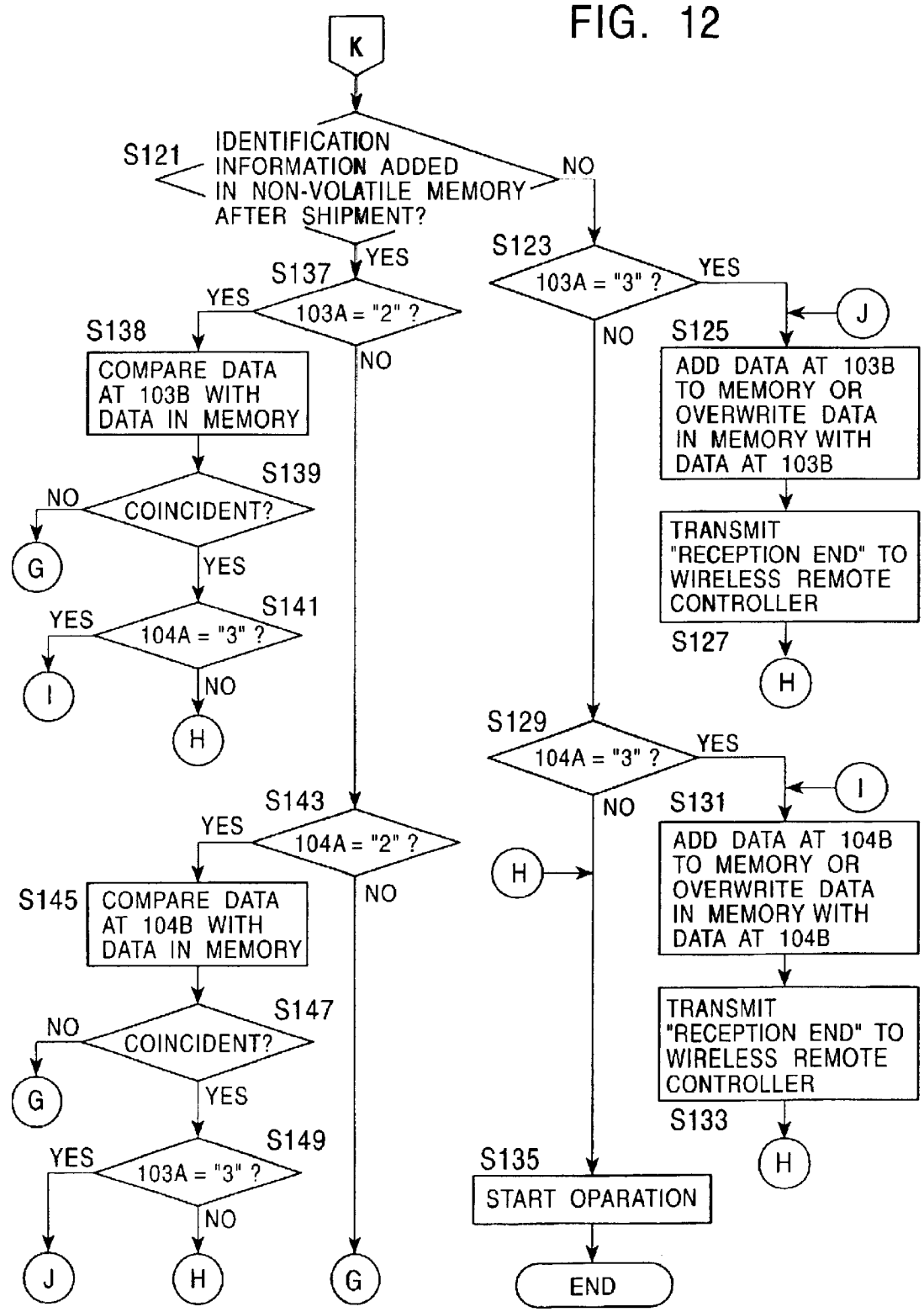
FIG. 12 is a continuation of the flow diagram of FIG. 11.

FIGS. 11 and 12 are flow diagrams illustrating the operation procedure of the onboard audio apparatus 2' which performs an authentication process based on the first identification information from the semiconductor storage medium 3.

The onboard audio apparatus 2' is installed on an automobile, and power is continuously connected thereto (with a battery unit on). After detecting that the user starts the engine, the onboard audio apparatus 2' prepares for a startup (step S111).

The system controller 7 in the onboard audio apparatus 2' determines whether a signal is received from the wireless remote controller 31 (step S113). When the semiconductor storage medium 3 is loaded into the wireless remote controller 31 to transmit the identification information, the remote control signal transceiver block 34 of the onboard audio apparatus 2' receives the identification information. The received signal is output to the system controller 7. The system controller 7 performs step S115. When the system controller 7 determines in step S113 that no signal has been received from the wireless remote controller 31, the system controller 7 loops to the state prior to step S111 (G). Specifically, the system controller 7 waits on standby for information signals coming in through the remote control signal transceiver block 34 from the wireless remote controller 31.

If it is determined in step S113 that the signal is received from the wireless remote controller 31, the system controller 7 reads the identification data, namely, the first identification information from the received signal (step S115). A portion of the read information, corresponding to the initial identification information, is compared with the initial identification data in the non-volatile memory 11 in the system controller 7 (step S117). The coincidence/non-coincidence determination is performed (step S119). If the two pieces of data coincide with each other, the algorithm proceeds to step S121 (K). If the two pieces of data fail to coincide with each other, the algorithm loops to the state prior to step S111 (G). Specifically, the system controller 7 denies the operation of the onboard audio apparatus 2'.

It is determined in step S121 whether the second identification information stored in the non-volatile memory 11 is added after the shipment of the onboard audio apparatus 2'. If it is determined in step S121 that there is no additional information, the non-volatile memory 11 stores no data other than the initial identification information to be used in the authentication process. This means that the authentication process has ended prior to step S121. In the following steps, the system controller 7 determines whether the data in the semiconductor storage medium 3 to be read into the onboard audio apparatus 2' is present.

If it is determined in step S121 that no additional data is present, the system controller 7 determines the data, out of the received signal, corresponding to the flag of the segment 103A in the semiconductor storage medium 3 is "3" (step S123). If it is determined that the flag value of the segment 103A is "3", the system controller 7 adds the data in the segment 103B to the non-volatile memory 11 or overwrites the non-volatile memory 11 with the data in the segment 103B (step S125). The system controller 7 sends, to the wireless remote controller 31 through the remote control signal transceiver block 34, a signal notifying that the reception is completed (step S127). The system controller 7 proceeds to step S135 (H), thereby starting the operation of the onboard audio apparatus 2'. The onboard audio apparatus 2 causes the audio block 8 to operate, the operation panel 10 to be ready to receive inputs, and the display 9 to present a message indicating that the operation panel 10 is now ready. A command input on the operation panel 10 in the wireless remote controller 31 is received through the remote control signal transceiver block 34. The system controller 7 controls the audio block 8 in response to a signal transmitted from the wireless remote controller 31.

If it is determined in step S123 that the flag value stored in the segment 103A is not "3", the algorithm proceeds to step S129. The system controller 7 determines whether the data, out of the received signal, corresponding to the flag value stored in the segment 104A is "3". If the flag value stored in the segment 104A is "3", the data in the segment 104B corresponding to the segment 104A is the data which is not yet read into the onboard audio apparatus 2' after the user writes the data in the semiconductor storage medium 3. The system controller 7 thus adds the data in the segment 104B to the non-volatile memory 11 or overwrites the non-volatile memory 11 with the data in the segment 104B (step S131). The system controller 7 sends, to the wireless remote controller 31 through the remote control signal transceiver block 34, a signal notifying that the reception is completed (step S133). The system controller 7 proceeds to step S135 (H), thereby starting the operation of the onboard audio apparatus 2'.

If it is determined in step S121 that there is additional information, the non-volatile memory 11 stores data other than the initial identification information to be used in the authentication process. The system controller 7 needs to authenticate the user by determining whether this data coincides with the data stored in the semiconductor storage medium 3.

If it is determined in step S121 that there is additional information, the system controller 7 determines whether the data, out of the signal received from the wireless remote controller 31, corresponding to the flag of the segment 103A is "2" (step S137). If the flag value of the segment 103A is "2", the user set information stored in the segment 103B is already read into the onboard audio apparatus 2'. The system controller 7 compares the data in the segment 103B with a portion of the data in the non-volatile memory 11 (step S138). A coincidence/non-coincidence determination is made of these pieces of data (step S139). If the two pieces of data fail to coincide with each other, the system controller 7 determines that authentication is unsuccessful, and loops to the startup preparation (G) prior to step S111, thereby denying the operation of the onboard audio apparatus 2'.

If it is determined in step S139 that the data in the segment 103B coincides with the portion of the data in the non-volatile memory 11, the system controller 7 proceeds to step S141, and determines whether the flag value of the segment 104A is "3". If the flag value of the segment 104A is not "3" in step S141, there is no data that remains to be read into the onboard audio apparatus 2' after the user writes the data into the semiconductor storage medium 3. The system controller 7 proceeds to step S135 (H), thereby starting the operation of the onboard audio apparatus 2'.

If it is determined in step S141 that the flag value of the segment 104A is "3", there is data that remains to be read into the onboard audio apparatus 2' after being written into the semiconductor storage medium 3. The system controller 7 performs a read process to read the data in the segment 104B into the non-volatile memory 11. The algorithm then proceeds to step S131 (I). The system controller 7 adds the data in the segment 104B to the non-volatile memory 11 or overwrites the non-volatile memory 11 with the data in the segment 104B. In step S133, the system controller 7 sends, to the wireless remote controller 31, a signal notifying that the reception is completed, and thereby starting the operation of the onboard audio apparatus 2' (step S135).

If it is determined in step S137 that the flag value of the segment 103A is not "2", the system controller 7 determines in step S143 whether the flag value of the segment 104A is "2". In this way, the system controller 7 determines whether there is in the segment 104B the data which is already read into the onboard audio apparatus 2'. If it is determined in step S143 that the flag value of the segment 104A is not "2", the data in the segments 103B and 104B is not yet read into the onboard audio apparatus 2' and these pieces of data do not coincide with the data in the non-volatile memory 11. The system controller 7 determines that authentication is unsuccessful, and loops to the startup preparation (G) prior to step S111. In other words, the system controller 7 denies the operation of the onboard audio apparatus 2'.

If it is determined in step S143 that the flag value of the segment 104A is "2", the system controller 7 compares a portion of the signal, received from the wireless remote controller 31 and corresponding to the data in the segment 104B with a portion of the data in the non-volatile memory 11 (step S145). A coincidence/non-coincidence determination is made (step S147). If the two pieces of data fail to coincide with each other, the system controller 7 determines that authentication is unsuccessful, loops to the startup preparation state (G) prior to step S111, and denies the operation of the onboard audio apparatus 2'. If it is determined in step S147 that the data at the segment 104B coincides with the portion of the data in the non-volatile memory 11, the system controller 7 determines in step S149 whether the flag value of the segment 103A is "3". If the flag value of the segment 103A is not "3" in step S149, there is no data that remains to be read into the onboard .audio apparatus 2' after the user writes the data in the semiconductor storage medium 3. The system controller 7 performs step S135 (H), thereby starting the operation of the onboard audio apparatus 2'. If it is determined in step S149 that the flag value of the segment 103A is "3", there is, in the segment 103A, data that remains to be read into the onboard audio apparatus 2' after the user writes the data in the semiconductor storage medium 3. The system controller 7 reads the data in the segment 103B into the non-volatile memory 11. The algorithm proceeds to step S125 (J), and the system controller 7 adds the data in the segment 103B to the non-volatile memory 11 or overwrites the non-volatile memory 11 with the data in the segment 103B. After transmitting, to the wireless remote controller 31, a signal notifying that the signal reception is completed in step S127, the system controller 7 causes the onboard audio apparatus 2' to operate (step S135).

In the process illustrated in FIGS. 11 and 12, the reception end signal is sent to the wireless remote controller 31 in step S127 and step S133 after the information stored in the semiconductor storage medium 3 is stored in the non-volatile memory 11. The flag values in the segments 103A and 104A in the semiconductor storage medium 3 must be rewritten in the wireless remote controller 31 in response. The process of the wireless remote controller 31 will now be discussed.

Figure 13:
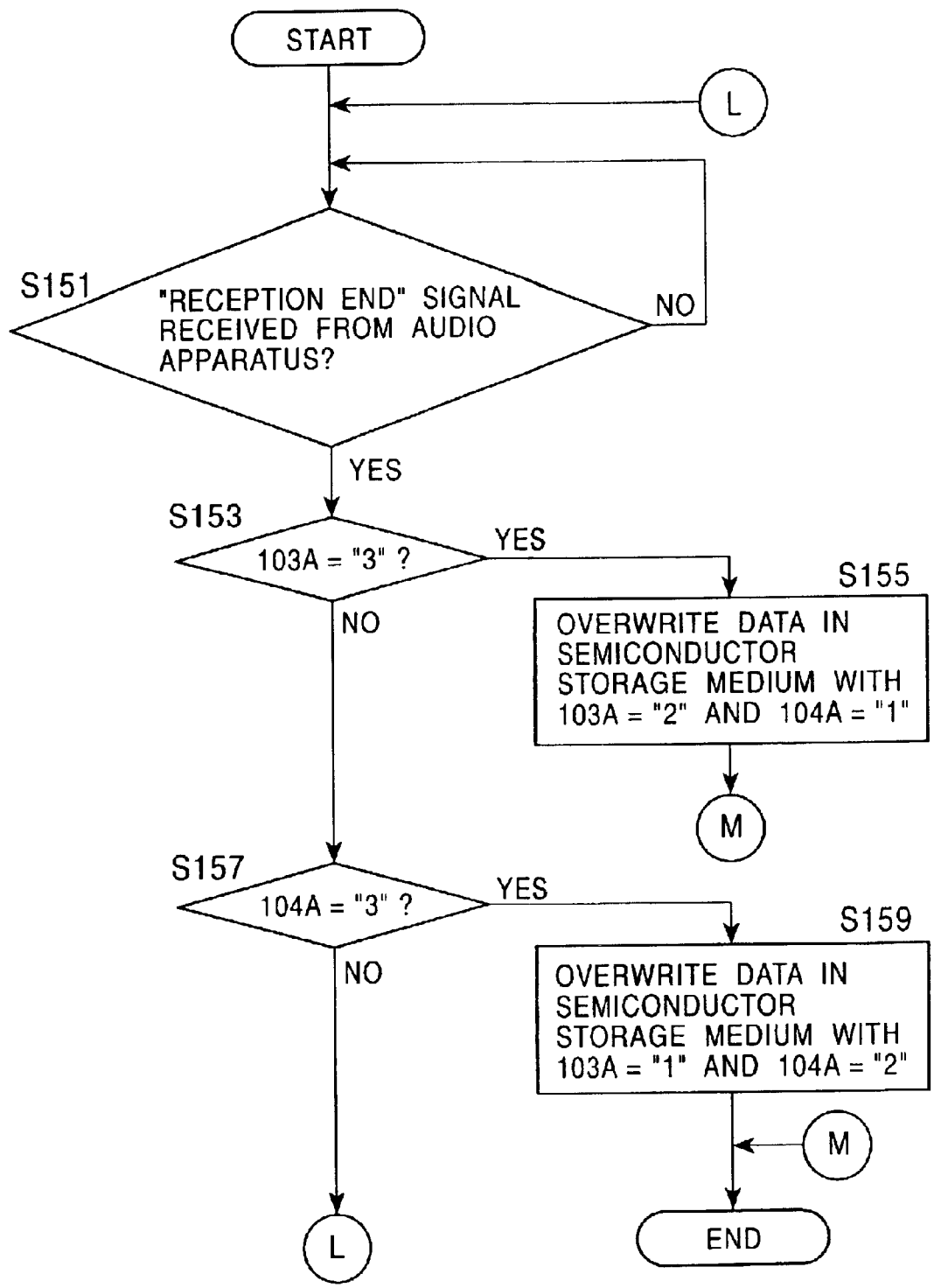
FIG. 13 is a flow diagram illustrating the operation procedure of the wireless remote controller when the authentication process ends in accordance with the second embodiment of the present invention.

Referring to FIG. 13, the system controller 36 in the wireless remote controller 31 determines whether the reception end signal has been received from the onboard audio apparatus 2' (step S151). The system controller 36 waits on standby for the signal. When the reception end signal is received, the system controller 36 determines whether the flag of the segment 103A in the semiconductor storage medium 3 is "3" (step S153). If the flag of the segment 103A is "3", the data of the segment 103B corresponding to this flag has already been read into the onboard audio apparatus 2'. The system controller 36 thus overwrites the flag of the segment 103A with "2" and the flag of the segment 104A with "1" (step S155). The algorithm ends (M).

If the flag of the segment 103A is not "3", the system controller 36 of the wireless remote controller 31 determines whether the flag of the segment 104A in the semiconductor storage medium 3 is "3" (step S157). If the flag of the segment 104A is "3", the data in the segment 103B corresponding to this flag has already been read into the onboard audio apparatus 2'. The system controller 36 overwrites the flag of the segment 103A with "1", and the flag of the segment 104A with "2" (step S159). The algorithm ends. If it is determined in step S157 that the flag of the segment 104A is not "3", there is no data that remains to be read into the onboard audio apparatus 2'. The algorithm loops to step S151, and the system controller 36 waits on standby for the signal from the onboard audio apparatus 2' again (L).

As in the first embodiment, the system controller 7 compares the initial identification information stored in the record segments 101 and 102 in the initial identification information record area 17, out of the first identification information stored in the semiconductor storage medium 3, with the portion of the second identification information stored in the non-volatile memory 11 in the onboard audio apparatus 2'. If there is the user set information in the record segments 103 and 104 in the user record area 18 in the semiconductor storage medium 3, the data stored in the segment 103B or 104B is compared with the portion of the data in the non-volatile memory 11 in the onboard audio apparatus 2' for coincidence/non-coincidence determination. The authentication process is thus performed. If no user set information is read into the onboard audio apparatus 2', the system controller 7 determines whether the flag value of the segment 103A or 104A is "3". The data in the segment 103B or 104B associated with the flag having the value "3" is added or written in the non-volatile memory 11. When the authentication process is performed again, the added data or overwriting data is used. When the system controller 7 writes the value "1" in the wireless remote controller 31, indicating that the overwriting is possible, into the flag associated with the data other than the read data, the user can write new user set data into the segment 103B or 104B in the semiconductor storage medium 3.

The authentication process is performed based on the identification information in addition to the initial identification information stored at shipment. The authentication process is also performed using the user set information when the user successively writes the information set by the user himself in the semiconductor storage medium 3. Like the first embodiment, the second embodiment assures a high standard of security. Furthermore, the second embodiment provides the same advantages as those of the first embodiment.

The second embodiment of the present invention has been discussed. The present invention is not limited to the second embodiment, and may use another construction without departing from the scope of the present invention.

For example, the second embodiment assures the security of the onboard audio apparatus 2'. The present invention is not limited to this arrangement. Alternatively, the present invention may be applied to other electronic apparatuses such as a computer or an electronic lock.

In the second embodiment, the data for authenticating the user is stored in the semiconductor storage medium 3. Alternatively, the authenticating data may be stored in other storage media such as an IC card or a magnetic storage medium. Instead of the wireless commander, a mobile telephone may be used to transmit identification information to the electronic apparatus, and to add data or overwrite data in the semiconductor storage medium 3.

In the second embodiment, the non-volatile memory 11 in the onboard audio apparatus 2' is contained in the system controller 7. Alternatively, the memory may be arranged external to the system controller 7.

The elements of the second embodiment may be selectively used, or applied another construction without departing from the scope of the present invention.

Third Embodiment

A third embodiment of the present invention is discussed below.

The major portion of the apparatus of the third embodiment is identical to that of the second embodiment illustrated in FIGS. 8 and 9. In the third embodiment, like components are designated with like reference numerals. The discussion thereof is omitted here, and the discussion that follows focuses on the difference of the third embodiment from the second embodiment.

Figure 14:
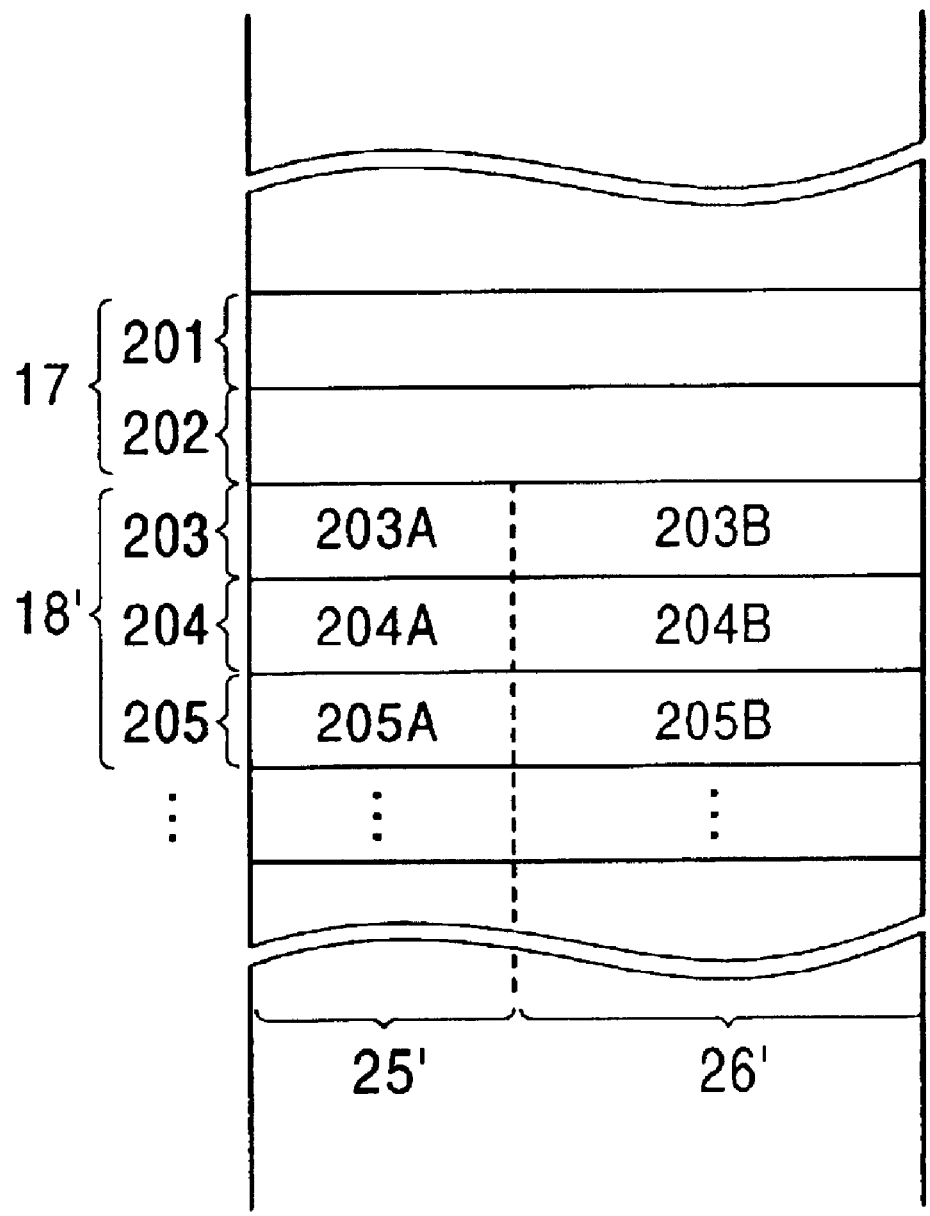
FIG. 14 diagrammatically illustrates an initial identification information record area and a user record area in each of the semiconductor storage medium of the third embodiment, and an IC card of a fourth embodiment.

The third embodiment of the present invention is different from the second embodiment in the segmentation of the record area of the semiconductor storage medium 3. Referring to FIG. 14, the user record area 18' in the semiconductor storage medium 3 includes at least three record segments 203, 204, 205, . . . in the third embodiment.

In this arrangement, the writing of the user set information to the semiconductor storage medium 3 is limited, and data addition only is accepted with no overwriting permitted once the user writes the user set information. The user may add the user set information for a plural number of times (the number equal to the number of record segments).

The operation of the electronic apparatus operation system 1' having the user record area 18' is discussed below.

Figure 15:
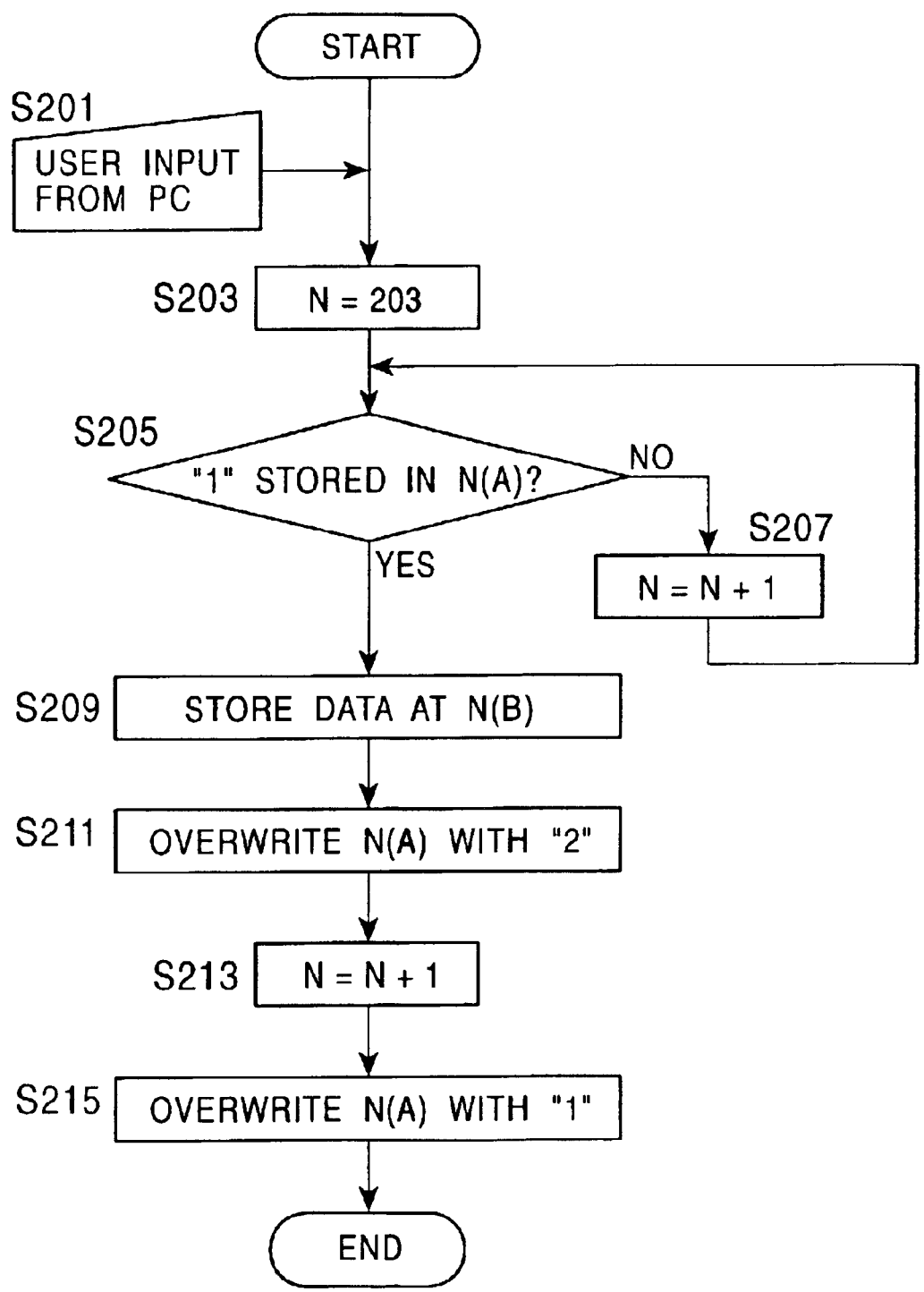
FIG. 15 is a flow diagram illustrating the operation procedure of the personal computer when the user adds or overwrites the identification information in the semiconductor storage medium or the user record area in accordance with the third and fourth embodiments of the present invention.

The operation of the personal computer 19 which stores the user set information in addition to the initial identification information in the semiconductor storage medium 3 is discussed with reference to FIG. 15.

When the user gets the electronic apparatus operation system 1', the user may input the user set information to the semiconductor storage medium 3 using the personal computer 19. Prior to the data input by the user, segments 203B, 204B, 205B, . . . in the user record section 26' of the user record area 18' are empty with no information stored. Segments 203A, 204A, 205A, . . . in the flag record section 25' have respectively "1", "0", "0", . . . . As in the first and second embodiments, the flag value "0" means that the segment corresponding thereto in the user record section 26' holds no data, and the flag value "1" means that the segment corresponding thereto in the user record section 26' is overwritable.

When the semiconductor storage medium 3 is loaded in the personal computer 19, the identification-information inputting software program 20 in the semiconductor storage medium 3 is read into the personal computer 19. The identification-information inputting software program 20 then runs on the personal computer 19 (START in FIG. 15).

When the user adds the user set information, the user set information is input to the personal computer 19 (step S201). For example, the identification-information inputting software program 20 may prompt the user to enter the user information such as the user's name, address, telephone number, or the user may enter the user set information in a free format.

The personal computer 19 sets an initial value for a variable N as N=203 (step S203). The personal computer 19 checks that "1" is stored at the record segment N(A). Since N=203, the personal computer 19 checks that the flag value of the 203A is "1" (step S205). If the flag value of 203A is not "1", the algorithm proceeds to step S207 to set for the variable N as N=N+1, and step S205 is repeated again. Step S205 and step S207 are repeated in this way. When the record segment N(A) having the value "1" recorded thereon is reached, the personal computer 19 stores the user set information input in step S201 to a record segment N(B) (step S209). The personal computer 19 overwrites the record segment N(A) with "2" (step S211). The value "2" means that overwriting of a portion of the user record section 26' corresponding to the segment having the flag is inhibited.

The personal computer 19 sets the variable N as N=N+1 (step S213), overwrites the record segment N(A) with "1" (step S215), and ends the process. For the next time, the overwriting of the user set information to N(B) corresponding to the record segment N(A) having the value "2" stored thereon is inhibited. The overwriting of the user set information to N(B) corresponding to the record segment N(A) having the value "1" stored thereon is permitted. New user set information is thus stored on N(A) at the next time.

The operation enable/disable determination process of the onboard audio apparatus 2' performed using the user set information stored in the semiconductor storage medium 3 is discussed below with reference to FIG. 16.

Figure 16:
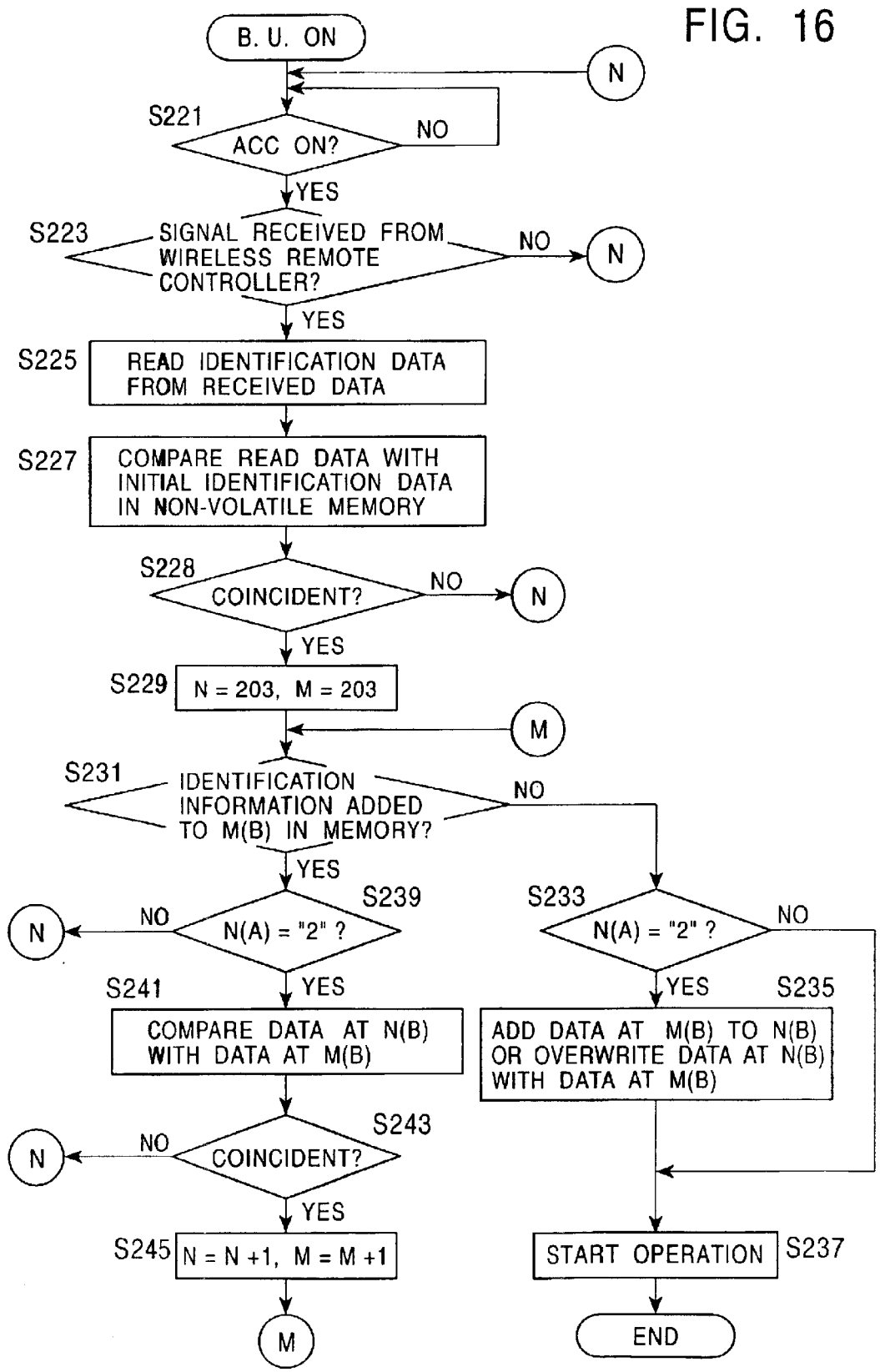
FIG. 16 is a flow diagram of the authentication process which the onboard audio apparatus performs using the identification information stored in the semiconductor storage medium in accordance with the third embodiment of the present invention.

Referring to FIG. 16, the onboard audio apparatus 2' is installed on an automobile, and power is continuously connected thereto (with a battery unit on). After detecting that the user starts the engine, the onboard audio apparatus 2' prepares for a startup (step S221).

The system controller 7 in the onboard audio apparatus 2' determines whether a signal is received from the wireless remote controller 31 (step S223). If no signal is received from the wireless remote controller 31, the algorithm loops to the state (N) prior to step S221, else the algorithm proceeds to step S225. The system controller 7 waits on standby for the signal from the wireless remote controller 31.

If the signal is received from the wireless remote controller 31, the system controller 7 reads a portion corresponding to the identification data stored in the semiconductor storage medium 3 (step S225), and compares a portion of the read data with the data corresponding to the initial identification information in the non-volatile memory 11 (step S227). If the two pieces of data fail to coincide with each other, the algorithm loops to the state (N) prior to step S221, else the algorithm proceeds to step S229. The system controller 7 sets variables N and M for N=203 and M=203.

The personal computer 19 determines whether the identification information is added to the record segment M(B) in the non-volatile memory 11 corresponding to the record segment N(B) in the semiconductor storage medium 3 (step S231). If it is determined in step S231 that there is no additional information, the non-volatile memory 11 has no data other than the initial identification information to be used in the authentication process. This means that the authentication process has ended prior to step S228. In the following steps, the system controller 7 determines whether the data in the semiconductor storage medium 3 to be read into the onboard audio apparatus 2' is present.

If it is determined in step S231 that no additional data is present, the system controller 7 determines whether the flag of the record segment N(A) in the semiconductor storage medium 3 is "2" (step S233). The flag of the record segment N(A) of "2" means that the user set information set by the user is stored at the record segment N(B). The data at N(B) is added to or overwrites the record segment M(B) in the non-volatile memory 11 corresponding to the record segment N(B) (step S235). The system controller 7 causes the onboard audio apparatus 2' to start operating (step S237). If it is determined that the record segment N(A) is not "2", the record segment N(B) has no user set information. The system controller 7 proceeds to step S237 without performing step S235, thereby starting the operation of the onboard audio apparatus 2'.

If it is determined in step S231 that there is additional authentication information, the additional authentication information needs to be compared with the additional authentication information in the semiconductor storage medium 3 for authentication. The system controller 7 determines whether "2" is stored at the record segment N(A) in the semiconductor storage medium 3 (step S239). If "2" is stored at the record segment N(A) in the semiconductor storage medium 3, the system controller 7 compares the data at the record segment N(B) with the data at the record segment M(B) in the non-volatile memory 11 (step S241). If it is determined in step S239 that "2" is not stored at the record segment N(A), the record segment N(B) has no user set information. The system controller 7 is unable to perform the coincidence/non-coincidence determination with the additional authentication information added to the non-volatile memory 11, and thus determines that authentication is unsuccessful. Looping to the state (N) prior to step S221, the system controller 7 denies the operation of the onboard audio apparatus 2'.

In response to the result in step S241, the system controller 7 determines whether the data at the record segment N(B) coincides with the data at the record segment M(B) (step S243). If the two pieces of data fail to coincide with each other, the system controller 7 determines the authentication process is unsuccessful, and loops to the state prior to step S221, thereby denying the operation of the onboard audio apparatus 2'. If the two pieces of data coincide with each other, the system controller 7 sets the variable N to N=N+1, and the variable M to M=M+1 (step S245). The algorithm loops to step S231 (M) to repeat the following process. By repeating the process from step S231 or from step S239 to step S245, the value of M is successively incremented until the record segment M(B) having no data added thereto in the non-volatile memory 11 is reached. At each value of M, the data at the record segment M(B) and the data at the record segment N(B) are compared for coincidence/non-coincidence determination. When the M reaches the value corresponding to the record segment M(B) having no data added thereon, the algorithm proceeds from step S231 to S233 and subsequent steps. The initial identification information in the semiconductor storage medium 3 is added to or overwrites the non-volatile memory 11. The system controller 7 starts the operation of the onboard audio apparatus 2'.

After the above series of process steps, the onboard audio apparatus 2' may be demounted after being connected to a power source. When the onboard audio apparatus 2' is reconnected to the power source, the system controller 7 of the onboard audio apparatus 2' thereof requires successively added information from the semiconductor storage medium 3 again. The authentication process is performed based on the identification information in addition to the initial identification information stored at the shipment of the apparatus. Even when the user successively adds the user set information to the semiconductor storage medium 3, the user set information is read into and stored in the onboard audio apparatus 2'. The user set information is then used for a next authentication process. A high degree of security is thus assured.

Unlike the conventional art, the present invention allows the user to add the user set information. Even if the authentication data is known to someone else, security is assured by adding data. Using the flag, the user set information is easily managed. Furthermore, the third embodiment provides the same advantages as those of the first and second embodiments.

The third embodiment of the present invention has been discussed. The present invention is not limited to the third embodiment, and may use another construction without departing from the scope of the present invention.

For example, the third embodiment assures the security of the onboard audio apparatus 2'. The present invention is not limited to this arrangement. Alternatively, the present invention may be applied to other electronic apparatuses such as a computer or an electronic lock. In the third embodiment, the data for authenticating the user is stored in the semiconductor storage medium 3. Alternatively, the authenticating data may be stored in other storage media such as an IC card or a magnetic storage medium. Instead of the wireless commander, a mobile telephone may be used to transmit identification information to the electronic apparatus, and to add data or overwrite data in the semiconductor storage medium 3.

In the third embodiment, the non-volatile memory 11 in the onboard audio apparatus 2' is contained in the system controller 7. Alternatively, the memory may be arranged external to the system controller 7.

The elements of the third embodiment may be selectively used, or applied to another construction without departing from the scope of the present invention.

Fourth Embodiment

A fourth embodiment of the present invention is discussed below.

In the discussion of the fourth embodiment, components identical to those described in connection with the first through third embodiments are designated with the same reference numerals, and the discussion thereof is omitted here.

Figure 17:
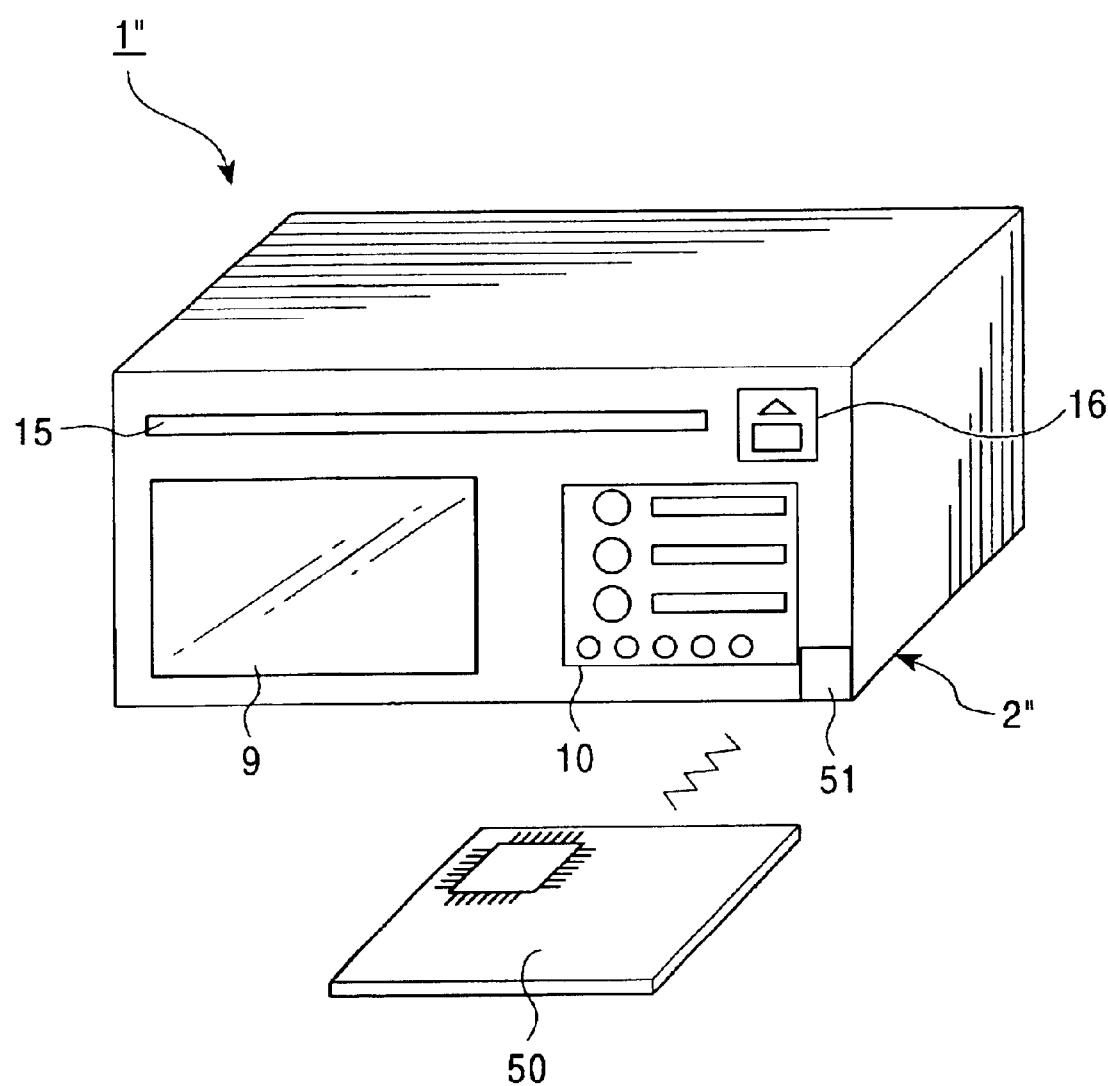
FIG. 17 is an external perspective view of the electronic apparatus operation system of the fourth embodiment of the present invention.

FIG. 17 illustrates an electronic apparatus operation system 1'' in accordance with the fourth embodiment of the present invention. The electronic apparatus operation system 1'' includes an onboard audio apparatus (electronic apparatus) 2'' and an IC card (information storage medium) 50 which exchanges data with the onboard audio apparatus 2''.

FIG. 17 is a block diagram of the electronic apparatus operation system 1''. As shown, the onboard audio apparatus 2'' includes a signal receiver 51 for receiving a signal from the IC card 50. The IC card 50 houses a semiconductor section (first storage device) 52 for storing information, and a low-level signal generator 53 for transmitting a low-level signal bearing information stored in the semiconductor section 52. The signal generated in the low-level signal generator 53 is received by the signal receiver 51 in the onboard audio apparatus 2'', and is then input to the system controller 7 in the onboard audio apparatus 2''.

The IC card 50 in the electronic apparatus operation system 1'' includes, in the record areas thereof, the initial identification information record area 17 and the user record area 18' like the third embodiment as shown in FIG. 14. The IC card 50 also stores the identification-information inputting software program 20.

The operation of the electronic apparatus operation system 1'' is discussed below.

In the electronic apparatus operation system 1'', the operation of the personal computer 19 for storing the user set information in addition to the initial identification information in the semiconductor storage medium 3 remains unchanged from that in the third embodiment. In accordance with the algorithm illustrated in FIG. 15, the user set information is successively stored in the user record area 18' in the IC card 50. The flag associated with the added user set information stores "2".

The process of the onboard audio apparatus 2'' for performing the operation enable/disable determination using the user set information stored in the IC card 50 is discussed with reference to FIG. 19.

Figure 19:
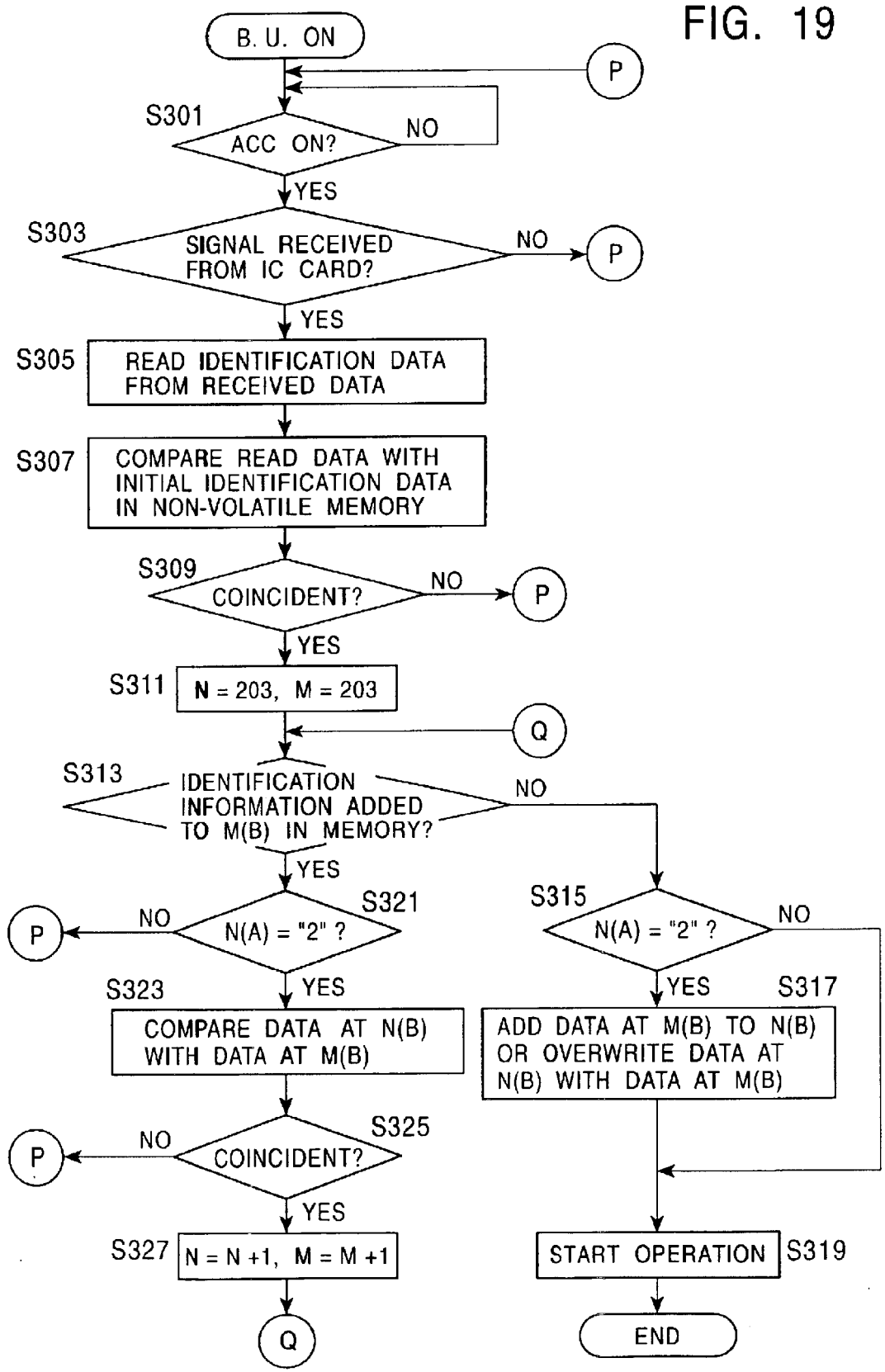
FIG. 19 is a flow diagram of the authentication process which the onboard audio apparatus performs using the identification information stored in the semiconductor storage medium in accordance with the fourth embodiment of the present invention.

Referring to FIG. 19, the onboard audio apparatus 2'' is installed on an automobile, and power is continuously connected thereto (with a battery unit on). After detecting that the user starts the engine, the onboard audio apparatus 2'' performs step S301 and subsequent steps.

The system controller 7 in the onboard audio apparatus 2'' determines whether a low-level signal is received from the IC card 50 (step S303). If it is determined that no signal is received from the IC card 50, the system controller 7 loops to the state (P) prior to step S303. If it is determined that the signal is received from the IC card 50, the algorithm proceeds to step S305. In this step, the system controller 7 waits on standby for the signal from the IC card 50.

If the signal is received from the IC card 50, the system controller 7 reads a portion of the received signal, corresponding to the identification information stored in the IC card 50 (step S305), and compares the read data with data corresponding to the initial identification information in the non-volatile memory 11 (step S307). A coincidence/non-coincidence determination is performed (step S309). If the two pieces of data fail to coincide with each other, the algorithm loops to the state (P) prior to step S301. If the two pieces of data coincide with each other, the algorithm proceeds to step S311. The system controller 7 sets variables N and M for N=203 and M=203.

The personal computer 19 determines whether the identification information is added to the record segment M(B) in the non-volatile memory 11 corresponding to the record segment N(B) in the IC card 50 (step S313). If it is determined in step S313 that there is no additional information, the non-volatile memory 11 has no data other than the initial identification information to be used in the authentication process. This means that the authentication process has ended prior to step S313. In the following steps, the system controller 7 determines whether the data in the IC card 50 to be read into the onboard audio apparatus 2'' is present.

If it is determined in step S313 that no additional data is present, the system controller 7 determines whether the flag of the record segment N(A) in the IC card 50 is "2" (step S315). The flag of the record segment N(A) of "2" means that the user set information set by the user is stored at the record segment N(B). The data at N(B) is added to or overwrites the record segment M(B) in the non-volatile memory 11 corresponding to the record segment N(B) (step S317). The system controller 7 starts the operation of the onboard audio apparatus 2" (step S319). If it is determined that the record segment N(A) is not "2", the record segment N(B) has no user set information. The system controller 7 proceeds to step S319 without performing step S317, thereby starting the operation of the onboard audio apparatus 2'.

If it is determined in step S313 that there is additional information, the two pieces of additional authentication information need to be compared with each other. The system controller 7 determines whether "2" is stored at the record segment N(A) in the IC card 50 (step S321). If "2" is stored at the record segment N(A), the system controller 7 compares the data at the record segment N(B) with the data at the record segment M(B) in the non-volatile memory 11 (step S323). If it is determined in step S321 that "2" is not stored at the record segment N(A), the record segment N(B) has no user set information. The system controller 7 is unable to perform the coincidence/non-coincidence determination with the additional authentication information added to the non-volatile memory 11, and thus determines that authentication is unsuccessful. Looping to the state (P) prior to step S301, the system controller 7 denies the operation of the onboard audio apparatus 2".

In response to the result in step S323, the system controller 7 determines whether the data at the record segment N(B) coincides with the data at the record segment M(B) (step S325). If the two pieces of data fail to coincide with each other, the system controller 7 determines the authentication process is unsuccessful, and loops to the state (P) in step S301, thereby denying the operation of the onboard audio apparatus 2". If the data at the record segment N(B) and the data at the record segment M(B) coincide with each other in step S325, the system controller 7 sets the variable N to N=N+1, and the variable M to M=M+1 (step S327). The algorithm loops to step S313 (Q) to repeat the following process. By repeating the process from step S313 or from step S321 to step S327, the value of M is successively incremented until the record segment M(B) having no data added thereto in the non-volatile memory 11 is reached. At each value of M, the data at the record segment M(B) and the data at the record segment N(B) are compared for coincidence/non-coincidence determination. The M reaches the value corresponding to the record segment M(B) having no data added thereon, the algorithm proceeds from step S313 to S315 and subsequent steps. The initial identification information in the IC card 50 is added to or overwrites the non-volatile memory 11. The system controller 7 starts the operation of the onboard audio apparatus 2".

After the above series of process steps, the onboard audio apparatus 2" may be demounted after being connected to a power source. When the onboard audio apparatus 2" is reconnected to the power source, the system controller 7 of the onboard audio apparatus 2" thereof requires successively added information from the IC card 50 again. The authentication process is performed based on the identification information in addition to the initial identification information stored at the shipment of the apparatus. Even when the user set information is successively added to the IC card 50, the user set information is read into and stored in the onboard audio apparatus 2". The user set information is then used for a next authentication process. A high degree of security is thus assured.

Unlike the conventional art, the present invention allows the user to add the user set information. Even if the authentication data is known to someone else, security is assured by adding data. Using the flag, the user set information is easily managed. Furthermore, the fourth embodiment provides the same advantages as those of the first through third embodiments.

There is no need for writing information onto the IC card 50 from the onboard audio apparatus 2" in the fourth embodiment. The fourth embodiment therefore requires no device for transmitting a signal to the IC card 50 from the onboard audio apparatus 2". With the simple construction of the apparatus, the security level thereof is heightened.

The fourth embodiment of the present invention has been discussed. The present invention is not limited to the fourth embodiment, and may use another construction without departing from the scope of the present invention.

For-example, the fourth embodiment assures the security of the onboard audio apparatus 2". The present invention is not limited to this arrangement. Alternatively, the present invention may be applied to other electronic apparatuses such as a computer or an electronic lock. In the fourth :embodiment, the data for authenticating the user is stored in the IC card 50. The present invention is not limited to the IC card 50. Data may be stored in any medium that transfers the data to a corresponding apparatus, regardless of whether the medium is linked with the host recorder thereof in a contact or non-contact fashion.

The elements of the fourth embodiment may be selectively used, or applied to another construction without departing from the scope of the present invention.

In accordance with the present invention, a simple operation disengages a security lock and the security of data to be input is assured. A high-level of security is assured to the apparatus.

What is claimed is:

1. An electronic apparatus comprising:
    a control unit for reading information from portable information storage medium that stores a first identification information,
    an operation unit that operates under the control of the control unit, and
    a memory that stores a second identification information set by a user,
    wherein the control unit reads information from and writes information to the memory, and
    wherein when a first portion of the first identification information being read from the portable information storage medium coincides with at least a first portion of the second identification information stored in the memory, the control unit causes the operation unit to operate, and causes the memory to additionally store a second portion included in the first identification information as a second portion of the second identification information.

2. The electronic apparatus according to claim 1, wherein when information to be read out of the first identification information includes the second portion, and when the first portion other than the second portion coincides with the first portion of the second identification information, the control unit causes the memory to additionally store the second portion of the first identification information as the second portion of the second identification information.

3. The electronic apparatus according to claim 2, wherein the control unit causes the information storage medium to store overwriting inhibition information with the second portion associated therewith when the control unit reads the additional portion.

4. The electronic apparatus according to claim 1, wherein when information to be read out of the first identification information includes a new overwriting portion, and when the second portion other than the new overwriting portion coincides with the second portion of the second identification information, the control unit causes the memory to store the new overwriting portion as the second portion of the second identification information.

5. The electronic apparatus according to claim 4, wherein the control unit causes the information storage medium to store reading end information with the new overwriting portion associated therewith when the control unit reads the new overwriting portion.

6. An electronic apparatus operating system including:
 a portable information storage medium having a read and write recording area with first identification information written on the recording area, and
 an electronic apparatus that reads the first identification information from the information storage medium,
 wherein the electronic apparatus comprises:
  a drive into which the information storage medium is loaded,
  a memory for storing second identification information corresponding to the first identification information of the portable information storage medium,
  a comparator that reads the first identification information from the information storage medium loaded into the drive and compares the read first identification information read by the comparator with the second identification information stored in the memory,
  a starter that operates in response to an output from the comparator, and
  an additional storage device for storing, in the memory, at least a portion of additional information about the first identification information stored in the recording area, as a portion of the second identification information.

7. The electronic apparatus operating system according to claim 6, wherein the drive and the comparator exchange information with each other through a radio link.

8. The electronic apparatus operation system according to claim 6, wherein the electronic apparatus is an onboard apparatus.

9. An authentication system that determines based on authentication of a user one of enabling and disabling at least one function of an electronic apparatus, the authentication system comprising:
 an information storage medium for storing first identification information of the user,
 a control unit that reads the first identification information from the information storage medium and determines one of enabling and disabling at least one function of the electronic apparatus, and
 a memory that is controlled by the control unit and that stores authentication information for authenticating the user,
 wherein the information storage medium includes a recording area for storing second identification information set by the user, and
 wherein when the authentication information set by the user in the information storage medium coincides with at least a portion of the second identification information, the control unit enables at least one of the functions of the electronic apparatus to operate.

10. The authentication system according to claim 9, wherein the second identification information comprises user information set by the user, and
 a flag associated with the user information,
 wherein the control unit determines whether the user information associated with the flag having a first predetermined value, out of the second identification information, coincides with the authentication information.

11. The authentication system according to claim 10, wherein the control unit causes the memory to store, as a portion of the authentication information, user information, out of the second identification information, associated with a flag having a second predetermined value different from the first predetermined value.

12. The authentication system according to claim 11, wherein the control unit overwrites, with the first predetermined value, a flag, in the information storage medium, associated with the user information to be stored in the memory as the portion of the authentication information.

13. The authentication system according to claim 12, further comprising an identification information storage device for storing the second identification information set by the user in the information storage medium,
 wherein the control unit stores the second predetermined value to a flag in the information storage medium, other than the flag having the first predetermined value written thereon, and
 wherein the identification information storage device stores new user information in a segment of the record area to which the user information associated with the flag having the second predetermined value is to be stored.

14. The authentication system according to claim 12, further comprising an identification information storage device for storing the second identification information in the information storage medium,
 wherein the control unit stores a third predetermined value different from any of the first and second predetermined values, to a flag in the information storage medium other than the flag having the first predetermined value written thereon, and
 wherein the identification information storage device stores new user information in a segment where the user information associated with the flag having the third predetermined value is stored, and the identification information storage device stores the second predetermined value onto the flag.

15. A semiconductor information storage medium loaded at the startup of an electronic apparatus, and having portability for authenticating a user of the electronic apparatus, the semiconductor information storage medium comprising:
 an initial identification information recording area where initial identification information corresponding to initial authentication information stored in the electronic apparatus is electrically stored,
 and a user recording area where user information set by the user is electrically stored,
 wherein the information storage medium stores a startup software program for starting up one of an identification information storage device that stores the user information in the user recording area and for starting up a software program operating in the identification information storage device.

16. The semiconductor information storage medium according to claim 15, wherein the user record area comprises:

a user record section for storing the user information, and a flag record section, associated with the user information, for storing a flag representing the nature of the user information.

17. The semiconductor information storage medium according to claim 15, wherein the startup software program has a function of authentication.

18. A method for performing authentication by determining whether first identification information stored in a first storage device coincides with second identification information stored in a second storage device, the method comprising:

a first step of storing additional information to the first identification information in the first storage device, a second step of storing additional information onto the second storage device as a portion of the second identification information when the first identification information other than the additional information coincides with the second identification information, and a third step of determining whether the first identification information containing the additional information added thereto coincides with the second identification information with the portion added thereto.

* * * * *